(12) United States Patent
Ohsugi

(10) Patent No.: US 10,343,717 B2
(45) Date of Patent: Jul. 9, 2019

(54) TRAVEL VEHICLE AND METHOD FOR CONTROLLING TRAVEL VEHICLE

(71) Applicant: Komatsu Ltd., Tokyo (JP)

(72) Inventor: Shigeru Ohsugi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 146 days.

(21) Appl. No.: 15/319,080

(22) PCT Filed: Apr. 7, 2016

(86) PCT No.: PCT/JP2016/061440
§ 371 (c)(1),
(2) Date: Dec. 15, 2016

(87) PCT Pub. No.: WO2017/175361
PCT Pub. Date: Oct. 12, 2017

(65) Prior Publication Data
US 2018/0154935 A1    Jun. 7, 2018

(51) Int. Cl.
*B62D 15/02*    (2006.01)
*B60W 50/14*    (2012.01)
(Continued)

(52) U.S. Cl.
CPC .......... *B62D 15/021* (2013.01); *B60W 50/14* (2013.01); *B62D 15/0265* (2013.01); *G08G 1/0962* (2013.01); *G08G 1/165* (2013.01)

(58) Field of Classification Search
CPC ................. B62D 15/021; B62D 15/0265; B62D 5/0457; G08G 1/16; B60W 10/20; B60W 30/09; B60W 2510/20; B60W 2710/20; B60W 30/085; B60G 2400/05; B60G 2800/01; B60R 16/0233; B60T 8/17554
(Continued)

(56) References Cited

U.S. PATENT DOCUMENTS 4,800,975 A    1/1989    Oshita et al.
9,272,729 B2   3/2016    Minoshima et al.
(Continued)

FOREIGN PATENT DOCUMENTS

CN    1093663 A    10/1994
EP    0601588 A1   6/1994
(Continued)

OTHER PUBLICATIONS

International Search Report dated Jun. 28, 2016, issued for PCT/JP2016/061440.

*Primary Examiner* — Muhammad Shafi
(74) *Attorney, Agent, or Firm* — Locke Lord LLP

(57) ABSTRACT

A travel vehicle includes: a vehicle having a travel device and a vehicle body supported by the travel device; a steering device provided to the travel device; a steering angle detection device that detects detected steering angle data of the steering device; an attitude detection device that detects attitude data of the vehicle body; a travel speed detection device that detects travel speed data of the travel device; a turn data calculation unit that calculates turn data of the vehicle body based on the attitude data and the travel speed data; and a steering angle data correction unit that calculates first correction data on the detected steering angle data based on the detected steering angle data and the turn data.

6 Claims, 21 Drawing Sheets

(51) Int. Cl.
*G08G 1/0962* (2006.01)
*G08G 1/16* (2006.01)

(58) Field of Classification Search
USPC .......................................... 701/41
See application file for complete search history.

(56) References Cited

U.S. PATENT DOCUMENTS

| | | | | |
|---|---|---|---|---|
| 2003/0139883 A1* | 7/2003 | Takafuji | ............. | B60R 21/0132 |
| | | | | 701/301 |
| 2004/0094351 A1* | 5/2004 | Higashi | ............. | B62D 15/0245 |
| | | | | 180/402 |
| 2017/0234988 A1* | 8/2017 | Jafari | ..................... | G01S 19/47 |
| | | | | 701/1 |

FOREIGN PATENT DOCUMENTS

| | | | |
|---|---|---|---|
| JP | 62-88666 A | | 4/1987 |
| JP | 11-78939 A | | 3/1999 |
| JP | 2003-054436 A | | 2/2003 |
| JP | 2003-200847 A | | 7/2003 |
| JP | 2003-215241 A | | 7/2003 |
| JP | 2008-030590 A | | 2/2008 |
| JP | 2014-169055 | * | 9/2014 |
| JP | 2014-169055 A | | 9/2014 |
| WO | 2013/129090 A1 | | 9/2013 |

* cited by examiner

TRAVEL VEHICLE AND METHOD FOR CONTROLLING TRAVEL VEHICLE

FIELD

The present invention relates to a travel vehicle and a method for controlling the travel vehicle.

BACKGROUND

A travel vehicle includes such a steering device as disclosed in Patent Literature 1. The steering device disclosed in Patent Literature 1 includes a rotational angle sensor that detects the steering angle and a proximity switch that detects whether or not the front wheels are in a straight ahead state.

CITATION LIST

Patent Literature

Patent Literature 1: WO 2013-129090 A

SUMMARY

Technical Problem

In a technical field related to the travel vehicle, a collision damage reduction system that reduces damage from a collision between the travel vehicle and an object is known. If the collision damage reduction system is controlled based on detected steering angle data detected by a steering angle detection device, or a travel device of the travel vehicle is controlled, there is a demand for a technology that can reduce an error of the detected steering angle data detected by the steering angle detection device.

An object of an aspect of the present invention is to provide a travel vehicle that can reduce an error of detected steering angle data, and a method for controlling the travel vehicle.

Solution to Problem

According to a first aspect of the present invention, a travel vehicle comprises: a vehicle including a travel device and a vehicle body supported by the travel device; a steering device provided to the travel device; a steering angle detection device configured to detect detected steering angle data of the steering device; an attitude detection device configured to detect attitude data of the vehicle body; a travel speed detection device configured to detect travel speed data of the travel device; a turn data calculation unit configured to calculate turn data of the vehicle body based on the attitude data and the travel speed data; and a steering angle data correction unit configured to calculate first correction data on the detected steering angle data, based on the detected steering angle data and the turn data.

According to a second aspect of the present invention, a method for controlling a travel device, comprises: detecting detected steering angle data of a steering device provided to a travel device of a vehicle; detecting attitude data of a vehicle body of the vehicle supported by the travel device; detecting travel speed data of the travel device; calculating turn data of the vehicle body based on the attitude data and the travel speed data; and calculating first correction data on the detected steering angle data, based on the detected steering angle data and the turn data.

Advantageous Effects of Invention

According to an aspect of the present invention, a travel vehicle that can reduce an error of detected steering angle data, and a method for controlling the travel vehicle are provided.

DESCRIPTION OF EMBODIMENTS

Embodiments according to the present invention is described hereinafter with reference to the drawings. However, the present invention is not limited to the embodiments. Components of each embodiment described below can be combined as appropriate. Moreover, part of the components may not be used.

[Mining Site in Mine]

Figure 1:
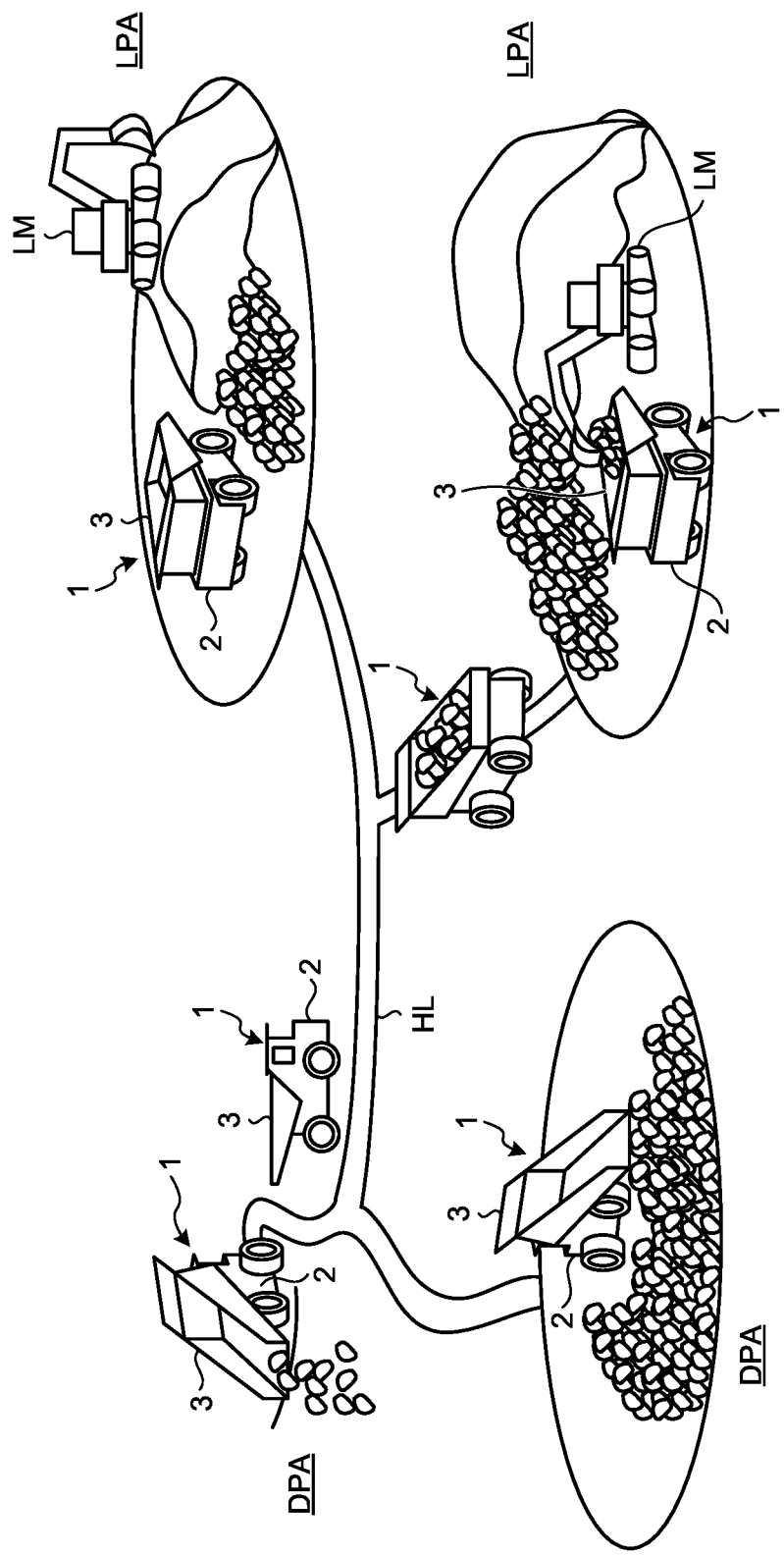
FIG. 1 is a schematic diagram illustrating an example of a mining site of a mine according to the embodiment.

FIG. 1 is a schematic diagram illustrating an example of a mining site of a mine where a travel vehicle 1 according to the embodiment operates. In the embodiment, the travel vehicle 1 is a dump truck 1 being a kind of transport vehicle. The dump truck 1 is a work vehicle called an off-highway truck. The dump truck 1 includes a vehicle 2 and a vessel 3 provided to the vehicle 2, and transports a load loaded on the vessel 3. The load includes at least one of mined crushed stone, earth and sand, and ores.

The mining site in the mine is provided with a load site LPA, a dump site DPA, and a travel road HL leading to at least one of the load site LPA and the dump site DPA. The dump truck 1 can travel on at least part of the load site LPA, the dump site DPA, and the travel road HL. The dump truck 1 can move between the load site LPA and the dump site DPA by traveling on the travel road HL. At the load site LPA, a load is loaded onto the vessel 3 by a loading machine LM. An excavator or a wheel loader is used as the loading machine LM. The dump truck 1, on which the load is loaded, travels on the travel road HL from the load site LPA to the dump site DPA. The load is dumped from the vessel 3 in the dump site DPA. The dump truck 1, which has dumped the load, travels on the travel road HL from the dump site DPA to the load site LPA. The dump truck 1 may travel from the dump site DPA to a predetermined standby site.

[Dump Truck]

Figure 2:
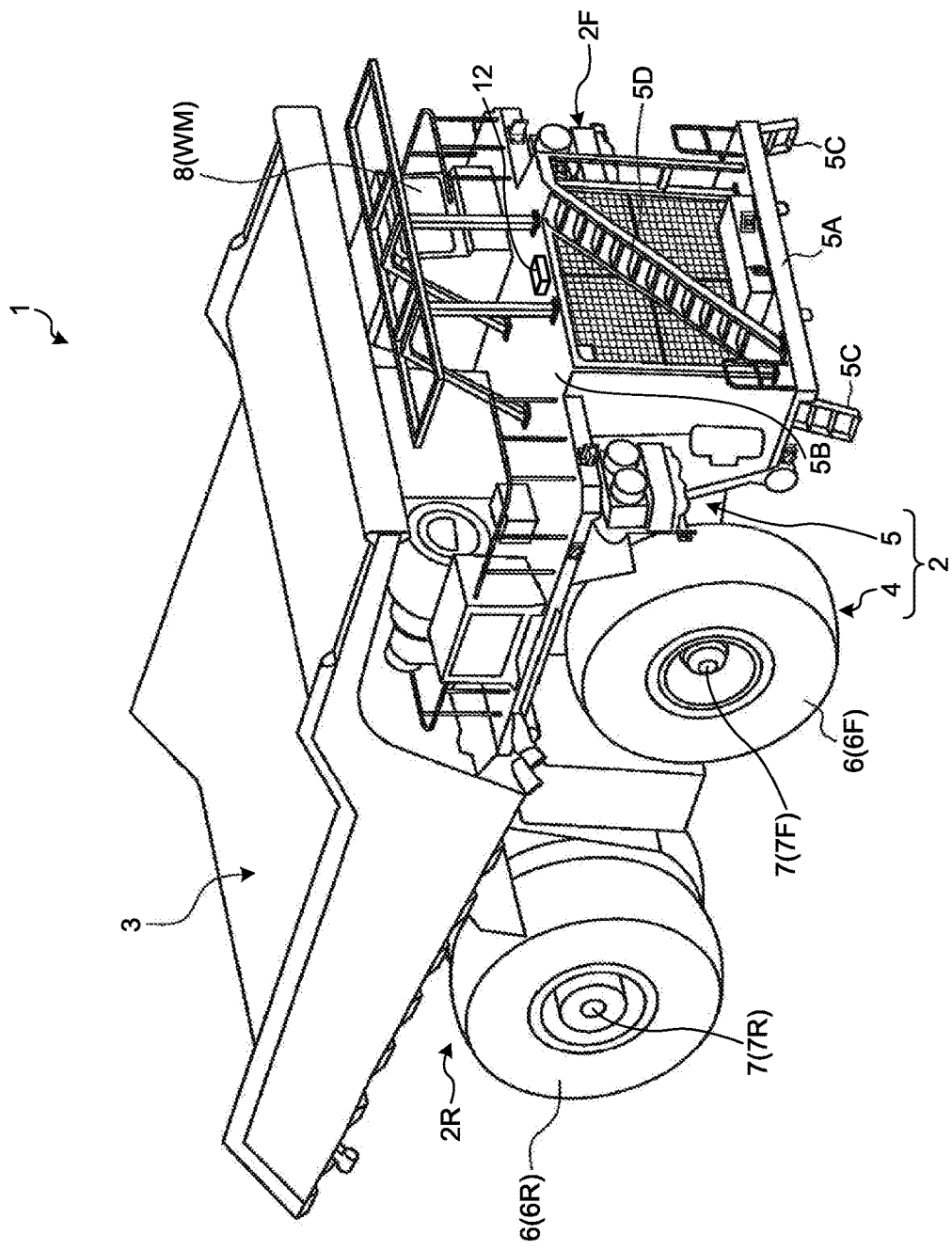
FIG. 2 is a perspective view illustrating an example of a transport vehicle according to the embodiment.

Next, the dump truck 1 is described. FIG. 2 is a perspective view illustrating an example of the dump truck 1 according to the embodiment.

In the embodiment, the dump truck 1 is a manned dump truck that is operated by a driver WM on board a cab 8 being a driver's compartment. Moreover, in the embodiment, the dump truck 1 is a rigid dump truck.

The dump truck 1 includes the vehicle 2 having a front side 2F and a rear side 2R, and the vessel 3 provided to the vehicle 2. The vehicle 2 includes a travel device 4 and a vehicle body 5 supported by the travel device 4. At least part of the vehicle body 5 is placed above the travel device 4. The vessel 3 is supported by the vehicle body 5.

The travel device 4 includes wheels 6 and axles 7 that support the wheels 6 rotatably. The wheel 6 includes a wheel supported by the axle 7 and a tire supported by the wheel. The wheels 6 include front wheels 6F and rear wheels 6R. The front wheels 6F include one right front wheel and one left front wheel. The rear wheels 6R include one right rear wheel and one left rear wheel. In other words, the travel device 4 is a four-wheeled vehicle having four wheels 6. The axles 7 include an axle 7F that supports the front wheels 6F rotatably and an axle 7R that supports the rear wheels 6R rotatably.

The vehicle body 5 includes a lower deck 5A, an upper deck 5B, a ladder 5C placed under the lower deck 5A, and a ladder 5D placed in such a manner as to connect the lower deck 5A and the upper deck 5B. The lower deck 5A is placed in the lower part at the front of the vehicle body 5. The upper deck 5B is placed above the lower deck 5A at the front of the vehicle body 5.

The vehicle 2 includes the cab 8. The cab 8 is placed on the upper deck 5B. The driver WM rides in the cab 8 to operate the dump truck 1. The driver WM can get in and off the cab 8 using the ladder 5C. The driver WM can move between the lower deck 5A and the upper deck 5B using the ladder 5D.

The vessel 3 is a member where a load is loaded. The vessel 3 can rise and descend with respect to the vehicle 2 by a hoisting device. The hoisting device includes an actuator such as a hydraulic cylinder (hoist cylinder) placed between the vessel 3 and the vehicle body 5. The vessel 3 is raised by the hoisting device to unload the load on the vessel 3.

[Cab]

Figure 3:
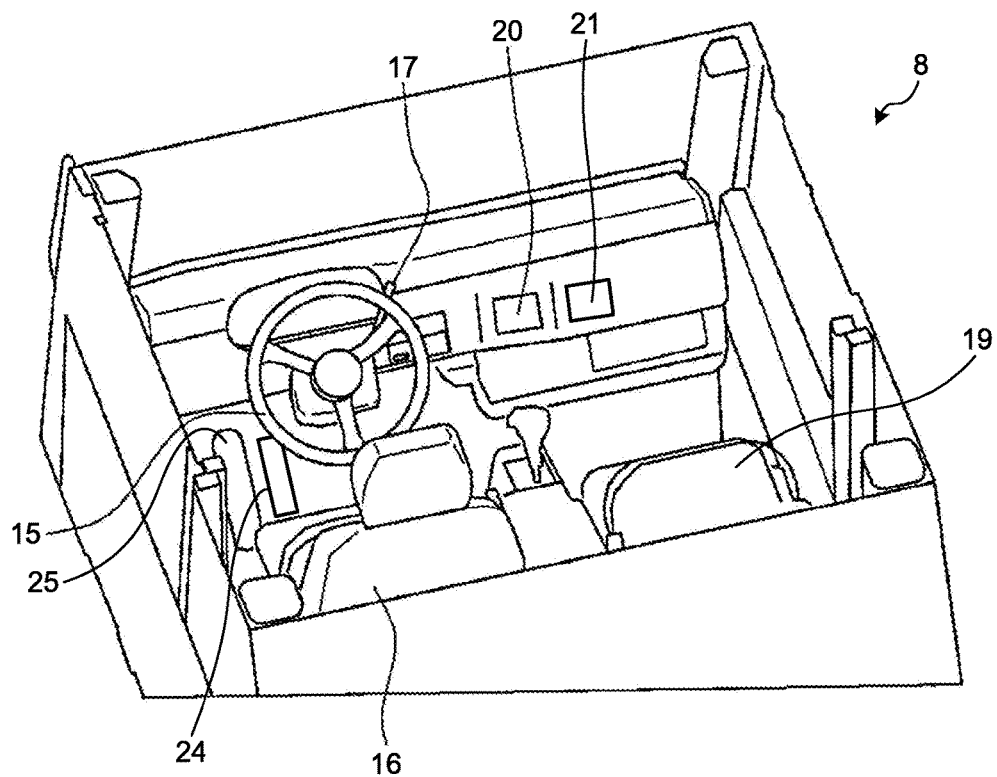
FIG. 3 is a diagram illustrating an example of a cab according to the embodiment.

Next, the cab 8 is described. FIG. 3 is a diagram illustrating an example of the cab 8 according to the embodiment. A plurality of operation devices that is operated by the driver WM on board the cab 8 is placed in the cab 8. As illustrated in FIG. 3, the cab 8 is provided with a driver's seat 16, a trainer seat 19, an output operation unit 24, a brake operation unit 25, a travel direction operation unit 15, a retarder operation unit 17, a display device 20 such as a flat panel display, and a warning device 21 that issues a warning. The operation devices that are operated by the driver WM include at least one of the output operation unit 24, the brake operation unit 25, the travel direction operation unit 15, and the retarder operation unit 17.

[Control System]

Next, a control system 300 of the dump truck 1 according to the embodiment is described. The dump truck 1 includes the control system 300 that controls the dump truck 1. In the embodiment, the control system 300 includes a collision damage reduction system that reduces damage from a collision between the dump truck 1 and an object ahead of the dump truck 1.

Figure 4:
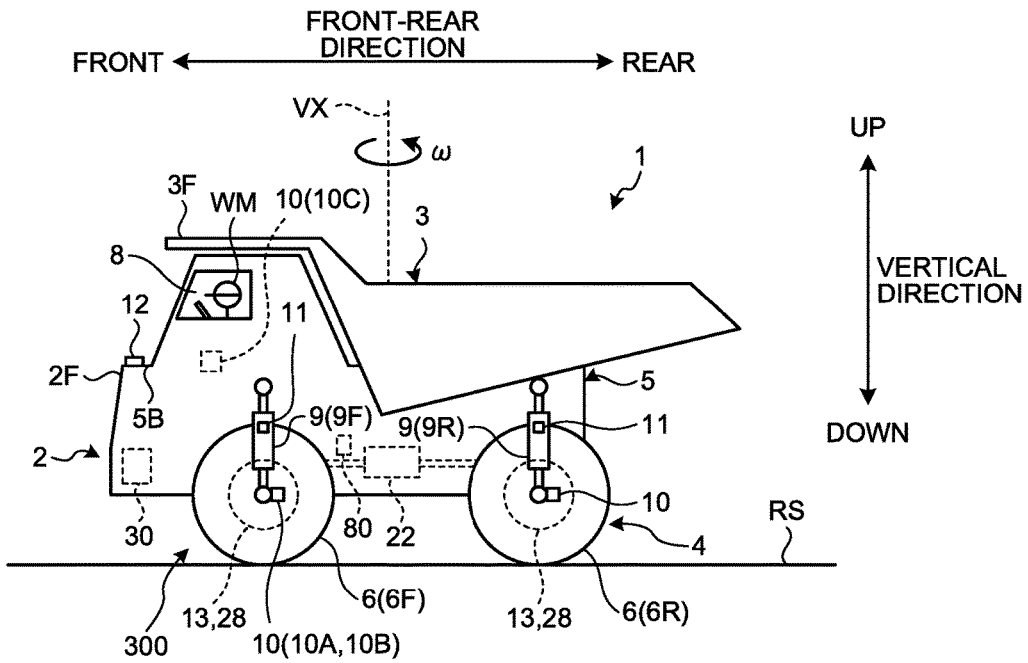
FIG. 4 is a side view schematically illustrating an example of a travel vehicle according to the embodiment.
Figure 5:
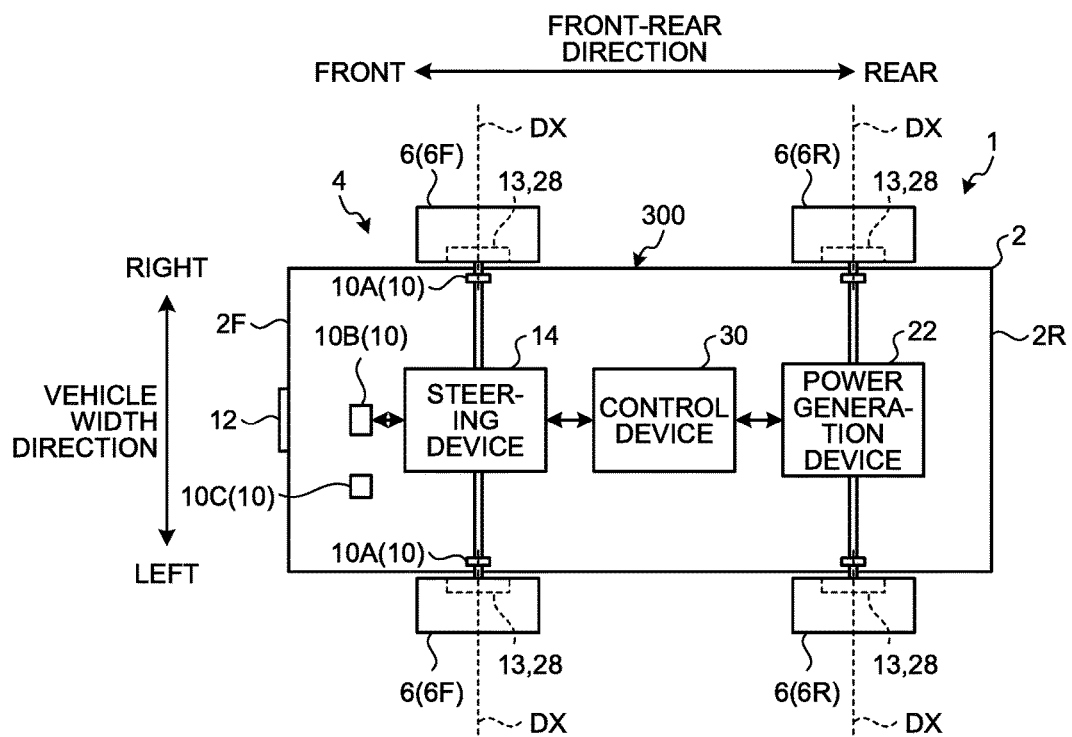
FIG. 5 is a plan view schematically illustrating an example of the travel vehicle according to the embodiment.

FIG. 4 is a side view schematically illustrating an example of the dump truck 1 according to the embodiment. FIG. 5 is a plan view schematically illustrating an example of the dump truck 1 according to the embodiment. The dump truck 1 travels on a road surface RS in the mine. In FIGS. 4 and 5, the road surface RS is assumed to be substantially parallel to a horizontal plane.

The wheel 6 rotates about a rotation axis DX. In the following description, a direction that is parallel to the rotation axis DX when the dump truck 1 travels in a straight ahead state is referred to as the vehicle width direction as appropriate. Moreover, a direction that is parallel to a vertical axis orthogonal to the road surface RS is referred to as the vertical direction as appropriate. Moreover, a direction that is orthogonal to both of the rotation axis DX and the vertical axis when the dump truck 1 travels in the straight ahead state is referred to as the front-rear direction as appropriate.

In the embodiment, a direction where the front side 2F of the vehicle body 5 exists with respect to the driver WM seated in the driver's seat 16 is the front, and a direction opposite to the front is the rear. One side in the vehicle width direction is the right. A direction opposite to the right is the left.

The control system 300 includes a travel state detection device 10 that detects the travel state of the dump truck 1, a loaded state detection device 11 that detects the loaded state of a load on the vessel 3, an object detection device 12 that detects an object ahead of the dump truck 1, and a control device 30 that controls the dump truck 1. Detection data of the travel state detection device 10, detection data of the loaded state detection device 11, and detection data of the object detection device 12 are output to the control device 30. The control device 30 performs a process for reducing damage from a collision between the dump truck 1 and an object based on at least one of the detection data of the travel state detection device 10, the detection data of the loaded state detection device 11, and the detection data of the object detection device 12.

The travel state of the dump truck 1 includes at least one of the attitude of the vehicle body 5, and the travel speed of the travel device 4.

The attitude of the vehicle body 5 includes at least one of the orientation of the vehicle body 5, and the yaw rate of the vehicle body 5. The orientation of the vehicle body 5 indicates a direction toward which the front side 2F of the vehicle body 5 is oriented in a plane parallel to the road surface RS. The orientation of the front side 2F of the vehicle body 5 indicates the travel direction of the dump truck 1. The yaw rate indicates an angular velocity ω of the vehicle body 5 in the direction of rotation about a center axis VX that passes a point of the center of gravity of the dump truck 1 and is parallel to the vertical axis.

The loaded state of a load on the vessel 3 includes at least one of the presence or absence of a load on the vessel 3, and the weight of the load loaded on the vessel 3.

The dump truck 1 includes a power generation device 22 that generates power, suspension cylinders 9 each having at least a part connected to the travel device 4, and a brake device 13 for stopping the travel device 4.

The travel device 4 is driven by the power generated by the power generation device 22. The power generation device 22 drives the travel device 4 by an electric drive system. The power generation device 22 includes an internal combustion engine such as a diesel engine, a generator that operates by the power of the internal combustion engine, and a motor that operates by the power generated by the generator. The power generated in the motor is transmitted to the wheels 6 of the travel device 4. Consequently, the travel device 4 is driven. The power generated by the power generation device 22 provided to the vehicle 2 causes the dump truck 1 to self-propel itself.

The power generation device 22 may drive the travel device 4 by a mechanical drive system. For example, the power generated in the internal combustion engine may be transmitted to the wheels 6 of the travel device 4 via a power transmission device.

The travel device 4 includes a steering device 14 that changes the travel direction of the dump truck 1. The steering device 14 changes the direction of the front wheels 6F to change the travel direction of the dump truck 1.

The power generation device 22 is operated by the output operation unit 24 provided in the cab 8. The output operation unit 24 includes an output operation member such as an accelerator pedal. The driver WM can adjust the output of the power generation device 22 by operating the output operation unit 24. The output of the power generation device 22 is adjusted to adjust a travel speed V of the dump truck 1.

The brake device 13 is operated by the brake operation unit 25 provided in the cab 8. The brake operation unit 25 includes a brake operation member such as a brake pedal. The driver WM can operate the brake device 13 by operating the brake operation unit 25. The brake device 13 is operated to adjust the travel speed V of the dump truck 1.

The steering device 14 is operated by the travel direction operation unit 15 provided in the cab 8. The travel direction operation unit 15 includes a steering angle operation member such as a steering wheel. The driver WM can operate the steering device 14 by operating the travel direction operation unit 15. The steering device 14 is operated to adjust the travel direction of the dump truck 1.

The suspension cylinder 9 is placed between the wheel 6 and the vehicle body 5. The suspension cylinders 9 include a suspension cylinder 9F placed between the front wheel 6F and the vehicle body 5, and a suspension cylinder 9R placed between the rear wheel 6R and the vehicle body 5. The load of the weight of the vehicle body 5, the weight of the vessel 3, and the weight of the load loaded on the vessel 3 acts on the wheels 6 via the suspension cylinders 9.

The travel state detection device 10 includes a travel speed detection device 10A that detects travel speed data of the travel device 4, a steering angle detection device 10B that detects detected steering angle data of the steering device 14, and an attitude detection device 10C that detects attitude data of the vehicle body 5.

The travel speed detection device 10A detects the travel speed V of the travel device 4. The travel speed detection device 10A includes a rotational speed sensor that detects the rotational speed of the wheel 6. The rotational speed of the wheel 6 correlates with the travel speed V of the dump truck 1. Detection data of the rotational speed sensor is converted into the travel speed data of the dump truck 1. The travel speed detection device 10A detects the travel speed data indicating the travel speed V of the dump truck 1 based on the detection data of the rotational speed sensor.

The steering angle detection device 10B detects a steering angle θs of the steering device 14 provided to the travel device 4. In the embodiment, the steering angle θs detected by the steering angle detection device 10B is referred to as the detected steering angle θs as appropriate. The steering angle detection device 10B includes a potentiometer provided to the steering device 14. The potentiometer can detect the detected steering angle θs of the steering device 14. The steering angle detection device 10B detects the detected steering angle data indicating the detected steering angle θs of the steering device 14 based on detection data of the potentiometer.

The attitude detection device 10C detects the attitude of the vehicle body 5. The attitude data indicating the attitude of the vehicle body 5 includes at least one of travel direction data indicating the travel direction of the dump truck 1 indicating the orientation of the front side 2F of the vehicle body 5, and yaw rate data indicating the angular velocity ω of the vehicle body 5. The attitude detection device 10C includes an inertial measurement unit (Inertial Measurement Unit: IMU) provided to the vehicle body 5. The inertial measurement unit can detect the angular velocity ω indicating the yaw rate of the vehicle body 5. The inertial measurement unit is provided to, for example, the cab 8. The attitude detection device 10C detects the yaw rate data indicating the angular velocity ω of the vehicle body 5 based on detection data of the inertial measurement unit.

The loaded state detection device 11 detects at least one of the presence or absence of a load on the vessel 3 and the weight of the load loaded on the vessel 3. The loaded state detection device 11 includes a weight sensor that detects the weight of the vessel 3. In the embodiment, the weight sensor includes a pressure sensor that detects the pressure of hydraulic oil in an internal space of the suspension cylinder 9.

The object detection device 12 detects an object existing ahead of the dump truck 1 in a noncontact manner. The object detection device 12 is placed on the front side 2F of the vehicle 2. The object detection device 12 includes a radar device. The radar device can detect the presence or absence of an object existing ahead by emitting a radio wave or ultrasound, and receiving the radio wave or ultrasound reflected from the object. Moreover, the radar device can detect not only the presence or absence of an object but also a relative position to the object, and a relative speed to the object. The relative position to the object includes a relative distance to the object and a relative direction to the object. The object detection device 12 may include at least one of a laser scanner and a three-dimensional distance sensor.

Figure 6:
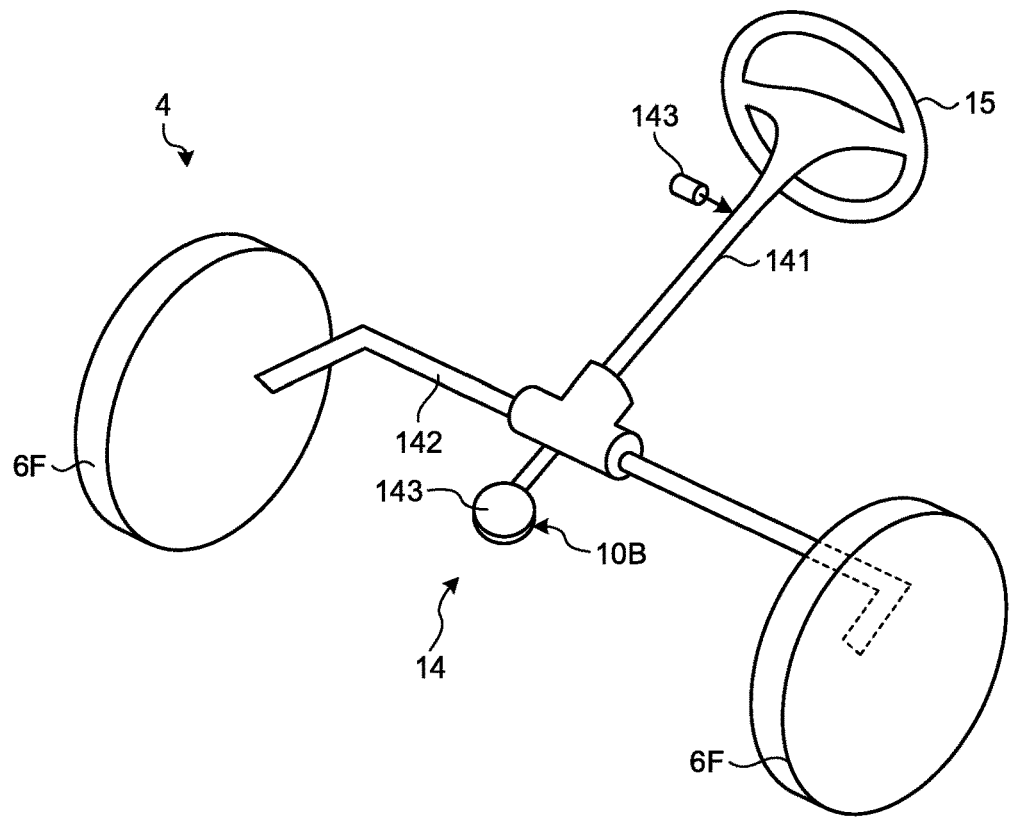
FIG. 6 is a diagram schematically illustrating an example of a steering device and a steering angle detection device according to the embodiment.

FIG. 6 is a diagram schematically illustrating the steering device 14 and the steering angle detection device 10B according to the embodiment. The steering device 14 is provided to the travel device 4, and steers the travel device 4. The steering angle detection device 10B is provided to the steering device 14 and detects the detected steering angle $\theta s$ of the steering device 14. The travel device 4 can travel in the straight ahead state and in a non-straight ahead state (in a turning state). The operation of the steering device 14 causes the travel device 4 to change the travel direction in such a manner as to change from one of the straight ahead state and the non-straight ahead state to the other. The steering device 14 changes the orientation of the front wheels 6F to change the travel direction of the dump truck 1.

The steering device 14 includes a column 141 that is connected to the travel direction operation unit 15 and rotates together with the travel direction operation unit 15, and an orientation member 142 that is connected to the front wheels 6F of the wheels 6 and changes the orientation of the front wheels 6F based on the operation amount of the travel direction operation unit 15. The driver WM operates the travel direction operation unit 15 to operate the steering device 14. Accordingly, the travel direction of the dump truck 1 is adjusted.

Figure 7:
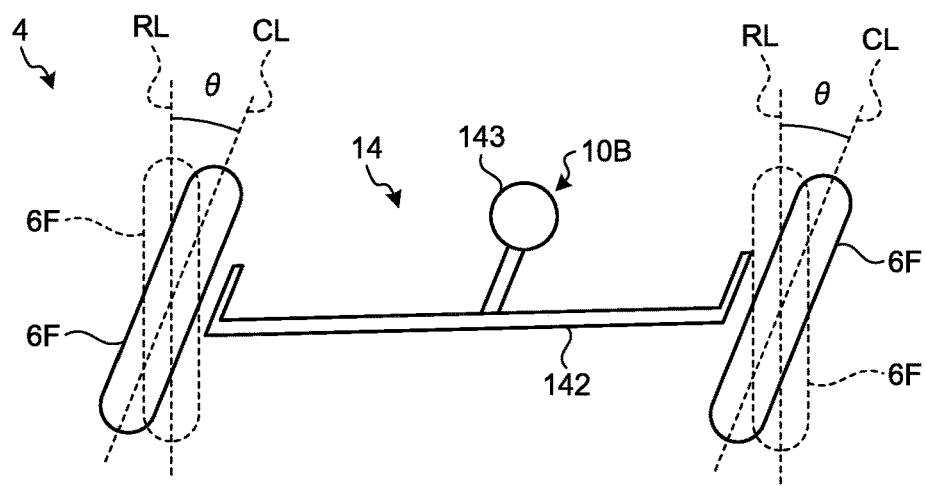
FIG. 7 is a diagram schematically illustrating an example of the steering device and the steering angle detection device according to the embodiment.

FIG. 7 is a diagram schematically illustrating an example of the steering device 14 and the steering angle detection device 10B according to the embodiment. In FIG. 7, dotted lines indicate the front wheels 6F of when the dump truck 1 travels straight. Solid lines indicate the front wheels 6F of when the dump truck 1 turns to the right. Assuming that a center line CL of the front wheel 6F of the travel device 4 in the straight ahead state is a reference line RL, the steering angle $\theta$ indicates an angle formed by the reference line RL and the center line CL of the front wheel 6F. When the dump truck 1 travels straight, the steering angle $\theta$ is 0[°]. In the embodiment, the steering angle $\theta$ of when the dump truck 1 turns to the right is assumed to be a positive value, and the steering angle $\theta$ of when the dump truck 1 turns to the left to be a negative value.

The steering angle detection device 10B detects the amount of operation of the steering device 14, and detects the detected steering angle data indicating the detected steering angle $\theta s$ of the steering device 14. The steering angle detection device 10B includes a potentiometer 143 that rotates in conjunction with the orientation member 142 and outputs an electric signal in accordance with the steering angle $\theta$.

In FIGS. 6 and 7, a plurality of the potentiometers 143 may be provided to the steering device 14. The detected operation angle data detected by the steering angle detection device 10B may be, for example, an average of detection data output from the plurality of potentiometers 143.

Figure 8:
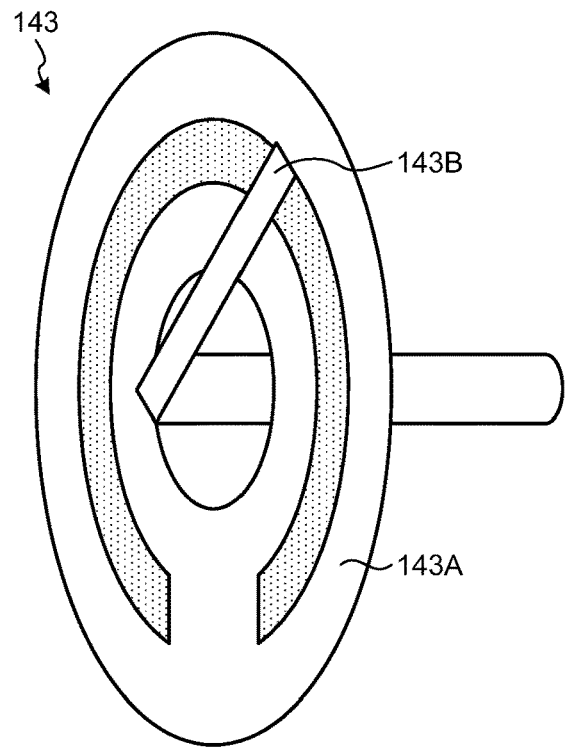
FIG. 8 is a diagram schematically illustrating an example of the steering angle detection device according to the embodiment.

FIG. 8 is a diagram schematically illustrating an example of the potentiometer 143 according to the embodiment. The potentiometer 143 includes a disc-shaped resistance plate 143A and a wiper 143B that rotates relatively to the resistance plate 143A. The wiper 143B rotates in contact with the resistance plate 143A and in conjunction with the orientation member 142. In the embodiment, the potentiometer 143 is a contact potentiometer where the resistance plate 143A and the wiper 143B rub against each other.

An electric resistance value between the resistance plate 143A and the wiper 143B changes according to the position of the wiper 143B with respect to the resistance plate 143A. The potentiometer 143 converts the electric resistance value between the resistance plate 143A and the wiper 143B into a voltage value, and outputs the voltage value. The steering angle detection device 10B detects the detected steering angle data indicating the detected steering angle $\theta s$ of the steering device 14 based on the voltage value output from the potentiometer 143.

Figure 9:
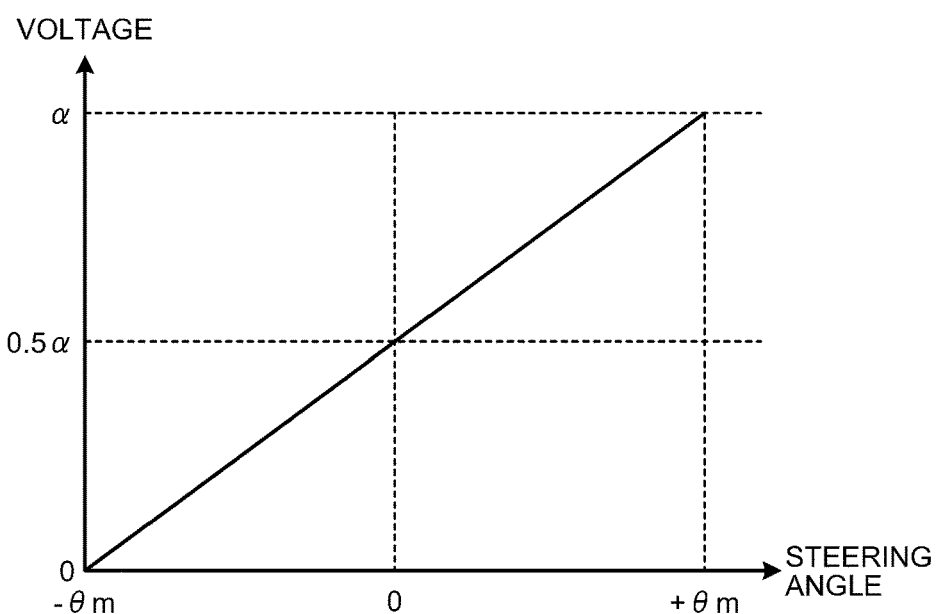
FIG. 9 is a diagram schematically illustrating an example of steering angle data detected by the steering angle detection device according to the embodiment.

FIG. 9 is a schematic diagram illustrating the relationship between the steering angle $\theta$ and the voltage output from the potentiometer 143 according to the embodiment. The steering device 14 can turn the front wheels 6F to the right within a range where the steering angle $\theta$ is equal to or more than 0 [°] and equal to or less than $\theta m$ [°]. Moreover, the steering device 14 can turn the front wheels 6F to the left within a range where the steering angle $\theta$ is equal to or more than $-\theta m$ [°] and equal to or less than 0 [°]. The potentiometer 143 is adjusted in such a manner as to output a voltage of 0 [V] when the steering angle $\theta$ of the front wheels 6F is $-\theta m$ [°], output a voltage of $\alpha$ [V] when the steering angle $\theta$ of the front wheels 6F is $+\theta m$ [°], and output $0.5\alpha$ [V] when the steering angle $\theta$ of the front wheels 6F is 0 [°]. Moreover, the potentiometer 143 is adjusted such that the voltage value to output is proportional to the steering angle $\theta$.

Figure 10:
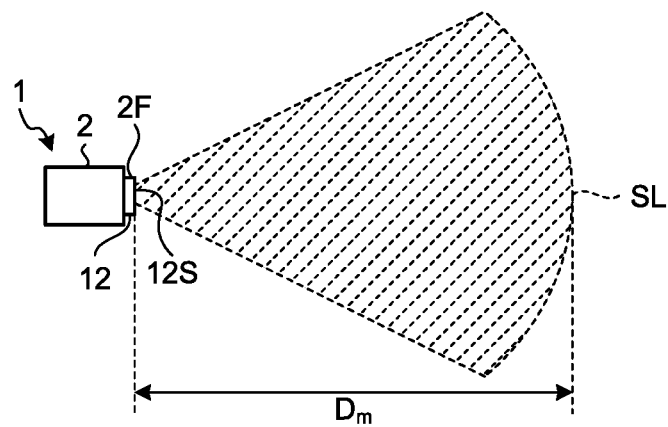
FIG. 10 is a schematic diagram illustrating an example of an object detection device according to the embodiment.

FIG. 10 is a schematic diagram illustrating an example of the object detection device 12 according to the embodiment. As illustrated in FIG. 10, the object detection device 12 includes the radar device placed on the front side 2F of the vehicle 2. The radar device includes a millimeter wave radar device. The object detection device 12 includes an emission unit 12S that emits radio waves or ultrasound. The object detection device 12 includes a detection area SL ahead of the vehicle 2. The object detection device 12 detects an object situated ahead of the vehicle 2 in the detection area SL. The detection area SL is formed in such a manner as to extend radially from the emission unit 12S both in the vertical direction and the vehicle width direction. The object detection device 12 can detect an object existing in the detection area SL. In the front-rear direction of the dump truck 1, a dimension of the detection area SL of the object detection device 12 is Dm. The dimension Dm is a distance between the emission unit 12S of the object detection device 12 that emits radio waves or ultrasound and a distal end of the detection area SL.

Figure 11:
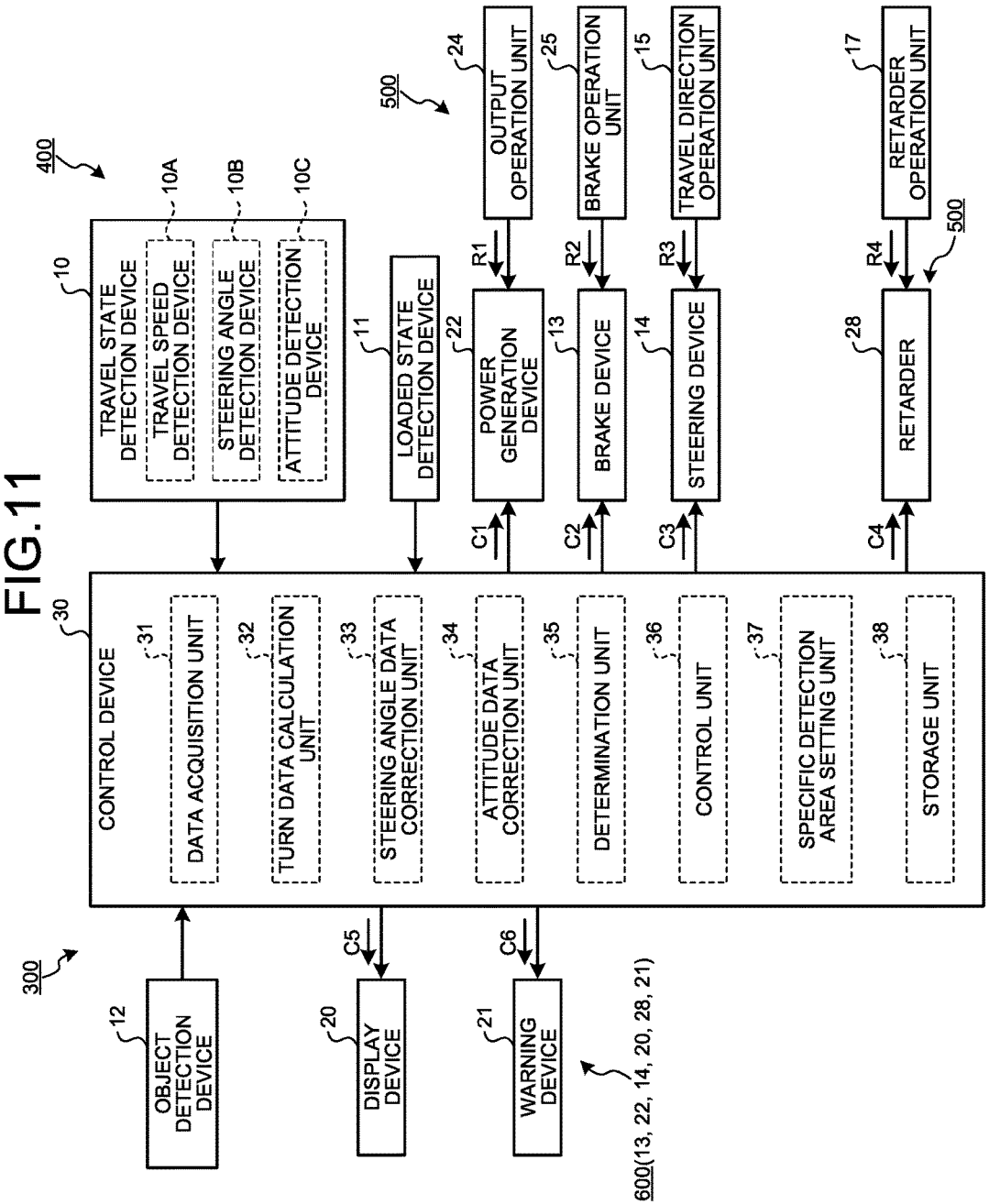
FIG. 11 is a function block diagram illustrating an example of a control system according to the embodiment.

FIG. 11 is a function block diagram illustrating an example of the control system 300 according to the embodiment. As illustrated in FIG. 11, the control system 300 includes the control device 30 that controls the dump truck 1, a state function detection system 400 that detects the state function of the dump truck 1, a travel condition adjustment system 500 that adjusts the travel conditions of the dump truck 1, and a processing system 600 that can perform a process for reducing damage to the dump truck 1 resulting from a collision with an object.

The control device 30 includes an arithmetic processing unit including a processor such as a CPU (Central Processing Unit), and a storage device including a memory such as a ROM (Read Only Memory) or a RAM (Random Access Memory) and a storage.

The state function detection system 400 includes the travel state detection device 10 and the loaded state detection device 11.

The travel condition adjustment system 500 includes the power generation device 22, the brake device 13, the travel device 4 having the steering device 14, and a retarder 28.

The processing system 600 includes the brake device 13, the power generation device 22, the steering device 14, the display device 20, the retarder 28, and the warning device 21.

The control device 30 is connected to the object detection device 12, the state function detection system 400, the travel condition adjustment system 500, and the processing system 600.

The control device 30 includes a data acquisition unit 31, a turn data calculation unit 32, a steering angle data correction unit 33, an attitude data correction unit 34, a determination unit 35, a control unit 36, a specific detection area setting unit 37, and a storage unit 38. The functions of the data acquisition unit 31, the turn data calculation unit 32, the steering angle data correction unit 33, the attitude data correction unit 34, the determination unit 35, the control unit 36, and the specific detection area setting unit 37 are achieved by the arithmetic processing unit. The function of the storage unit 38 is achieved by the storage device.

The data acquisition unit 31 acquires the detection data of the travel state detection device 10, the detection data of the loaded state detection device 11, and the detection data of the object detection device 12. The detection data of the travel state detection device 10 includes the travel speed data of the travel device 4 detected by the travel speed detection device 10A, the detected steering angle data of the steering device 14 detected by the steering angle detection device 10B, and the yaw rate data of the vehicle body 5 detected by the attitude detection device 10C.

The turn data calculation unit 32 calculates turn data of the vehicle body 5 based on the yaw rate data of the vehicle body 5 and the travel speed data of the travel device 14. In the embodiment, the turn data includes turning radius data of the vehicle body 5 and calculated steering angle data. The turn data calculation unit 32 calculates the turning radius data indicating a turning radius R of the vehicle body 5 based on the yaw rate data and the travel speed data. The turn data calculation unit 32 calculates the calculated steering angle data indicating a calculated steering angle θc based on the turning radius data calculated from the yaw rate data and the travel speed data.

The steering angle data correction unit 33 calculates first correction data on the detected steering angle data based on the detected steering angle data of the steering device 14 and the turn data of the vehicle body 5. In the embodiment, the steering angle data correction unit 33 calculates the first correction data based on the detected steering angle data and the calculated steering angle data.

The attitude data correction unit 34 calculates second correction data on the attitude data based on the attitude data that is detected by the attitude detection device 10C when the travel speed data is zero.

The specific detection area setting unit 37 sets a specific detection area SD, which is smaller than the detection area SL, in the detection area SL of the object detection device 12.

The determination unit 35 determines whether or not an object exists in the specific detection area SD, based on the detection data of the object detection device 12.

The control unit 36 outputs a control signal C for reducing damage to the dump truck 1 resulting from a collision with an object to the processing system 600 based on the determination result of the determination unit 35.

The storage unit 38 stores data for reducing damage to the dump truck 1 resulting from a collision with an object.

The power generation device 22 is connected to the output operation unit 24. The power generation device 22, which functions as a processing device of the processing system 600, executes an output reduction process that reduces a driving force that is supplied to the travel device 4, based on a control signal C1 from the control unit 36 or an operation signal R1 from the output operation unit 24. Accordingly, the power generation device 22 reduces the travel speed V of the dump truck 1. Consequently, damage from a collision between the dump truck 1 and an object ahead can be reduced.

The brake device 13 is connected to the brake operation unit 25. The brake device 13, which functions as a processing device of the processing system 600, executes a braking process that decelerates or stops the travel device 4, based on a control signal C2 from the control unit 36 or an operation signal R2 from the brake operation unit 25. Accordingly, the brake device 13 reduces the travel speed of the dump truck 1 or stops the travel of the dump truck 1. Consequently, damage from a collision between the dump truck 1 and an object ahead can be reduced.

The steering device 14 is connected to the travel direction operation unit 15. The steering device 14, which functions as a processing device of the processing system 600, executes a process of changing the travel direction of the dump truck 1, based on a control signal C3 from the control unit 36 or an operation signal R3 from the travel direction operation unit 15. Accordingly, the steering device 14 changes the travel direction of the dump truck 1 in such a manner as to avoid the existence of an object on the path of the dump truck 1. Consequently, damage from a collision between the dump truck 1 and the object ahead can be reduced.

The retarder 28 is connected to the retarder operation unit 17. The retarder 28, which functions as a processing device of the processing system 600, executes a braking process that decelerates or stops the travel device 4, based on a control signal C4 from the control unit 36 or an operation signal R4 from the retarder operation unit 17. Accordingly, the retarder 28 reduces the travel speed of the dump truck 1 or stops the travel of the dump truck 1. Consequently, damage from a collision between the dump truck 1 and an object ahead can be reduced.

The display device 20, which functions as a processing device of the processing system 600, executes a display process for drawing attention of the driver WM, based on a control signal C5 from the control unit 36. The display device 20 can warn the driver WM by displaying a warning image. For example, a warning mark or message to inform the possibility of a collision with an object existing ahead can be displayed as the warning image. Consequently, the driver WM's operation for reducing damage from a collision, for example, at least one operation of the output operation unit 24, the brake operation unit 25, the travel direction operation unit 15, and the retarder operation unit 17 is executed to reduce damage from a collision between the dump truck 1 and the object ahead.

The warning device 21, which functions as a processing device of the processing system 600, executes a warning issuance process for drawing attention of the driver WM, based on a control signal C6 from the control unit 36. The warning device 21 emits sound or light to inform the possibility of a collision with an object existing ahead, using, for example, a speaker or lamp, and accordingly can warn the driver WM. The warning device 21 may include a vibration generation device that can warn the driver WM by vibrating at least one of the travel direction operation unit 15 and the driver's seat 16. The warning device 21 may include a seatbelt adjustment device that can warn the driver WM by changing a fastening force of a seatbelt for protecting the driver WM seated in the driver's seat 16. Consequently, the driver WM's operation for reducing damage from a collision is executed to reduce damage from a collision between the dump truck 1 and the object ahead.

[Collision Damage Reduction Method]

Figure 12:
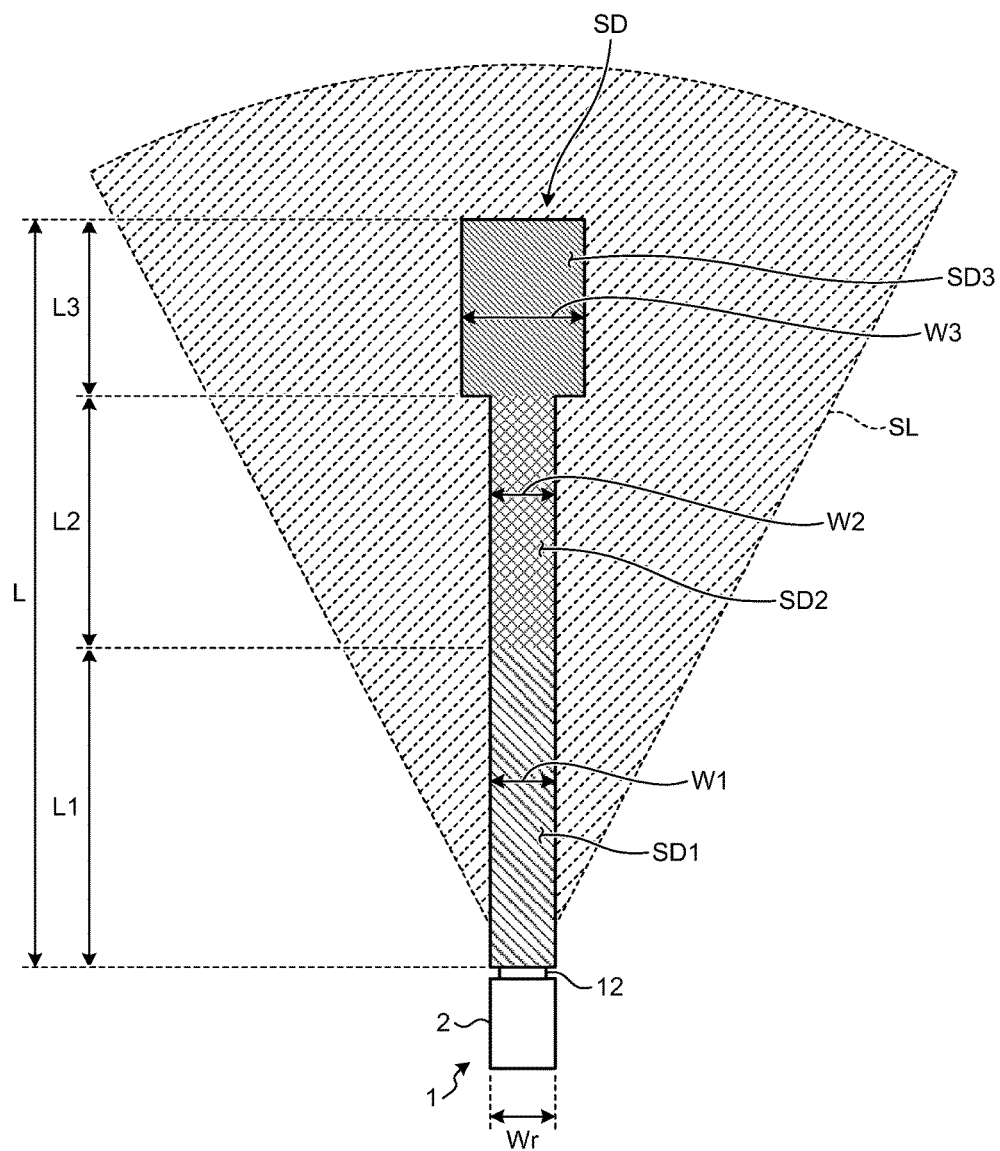
FIG. 12 is a diagram illustrating an example of a specific detection area according to the embodiment.

Next, an example of a collision damage reduction method according to the embodiment is described. FIG. 12 is a schematic diagram for explaining an example of the collision damage reduction method according to the embodiment. As illustrated in FIG. 12, in the embodiment, the specific detection area setting unit 37 sets the specific detection area SD having a width of a dimension W in the vehicle width direction of the dump truck 1 and a length of a dimension L in the travel direction of the dump truck 1, in the detection area SL of the object detection device 12 based on the detection data of the object detection device 12. The determination unit 35 determines whether or not an object exists in the specific detection area SD based on the detection data of the object detection device 12, and determines the possibility of a collision between the dump truck 1 and the object based on the determination result. The control unit 36 outputs the control signal C for reducing damage to the dump truck 1 resulting from a collision with the object to the processing system 600 based on the determination result of the determination unit 35.

As illustrated in FIG. 12, the specific detection area SD is an area that is smaller than the detection area SL. The outer shape of the specific detection area SD is substantially rectangular. The specific detection area SD includes a first section SD1, a second section SD2 that is farther in the travel direction from the vehicle 2 than the first section SD1, and a third section SD3 that is farther in the travel direction from the vehicle 2 than the second section SD2.

The first section SD1 has a width of a dimension W1 and a length of a dimension L1. The second section SD2 has a width of a dimension W2 and a length of a dimension L2. The third section SD3 has a width of a dimension W3 and a length of a dimension L3. The dimension W1 of the width of the first section SD1 is a dimension Wr in the vehicle width direction of the vehicle 2. The dimension W2 of the width of the second section SD2 is the dimension Wr in the vehicle width direction of the vehicle 2. The dimension W3 of the width of the third section SD3 is larger than the dimension W1 of the first section SD1 and the dimension W2 of the second section SD2.

The specific detection area setting unit 37 changes the shape of the specific detection area SD based on the travel conditions of the dump truck 1. In the embodiment, the travel conditions of the dump truck 1 include the relative speed between the dump truck 1 and an object ahead of the dump truck 1, the travel speed V of the dump truck 1, and the travel direction of the dump truck 1.

The object detection device 12 can detect the relative speed between the dump truck 1 and on object existing in the detection area SL. The specific detection area setting unit 37 changes the dimension L of the length of the specific detection area SD based on the relative speed detected by the object detection device 12. The specific detection area setting unit 37 reduces the dimension L of the specific detection area SD when having determined that the relative speed between the dump truck 1 and the object existing in the detection area SL is low, that is, when having determined that the distance between the dump truck 1 and the object ahead does not change or reduces slowly, based on the detection data of the object detection device 12. The specific detection area setting unit 37 increases the dimension L of the specific detection area SD when having determined that the relative speed between the dump truck 1 and the object existing in the detection area SL is high, that is, when having determined that the distance between the dump truck 1 and the object ahead reduces suddenly, based on the detection data of the object detection device 12.

The travel speed detection device 10A can detect the travel speed V of the dump truck 1. The specific detection area setting unit 37 changes the dimension L of the specific detection area SD based on the travel speed V of the dump truck 1 detected by the travel speed detection device 10A. The specific detection area setting unit 37 reduces the dimension L of the specific detection area SD when having determined that the travel speed of the dump truck 1 is low based on the travel speed data detected by the travel speed detection device 10A. The specific detection area setting unit 37 increases the dimension L of the specific detection area SD when having determined that the travel speed of the dump truck 1 is high based on the travel speed data detected by the travel speed detection device 10A.

Figure 13:
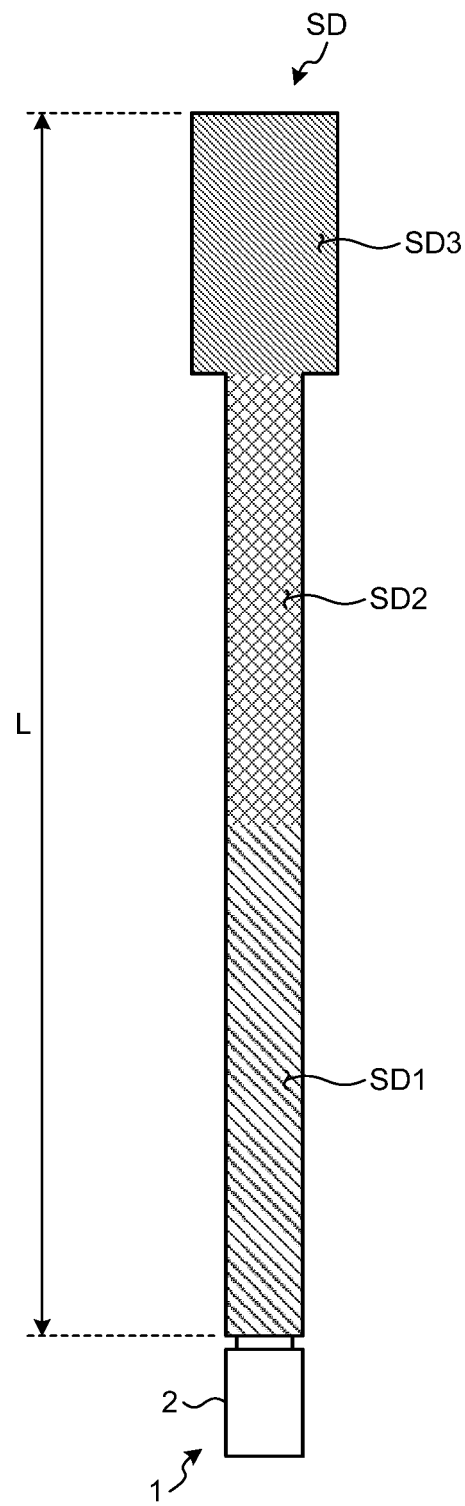
FIG. 13 is a diagram illustrating an example of the specific detection area according to the embodiment.
Figure 14:
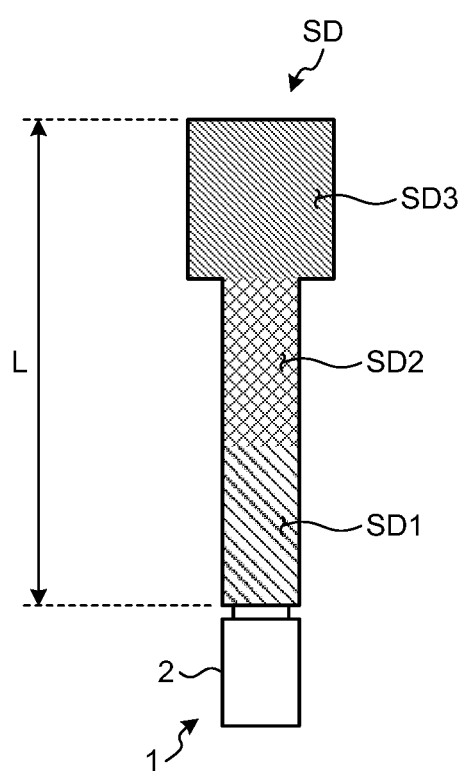
FIG. 14 is a diagram illustrating an example of the specific detection area according to the embodiment.

FIG. 13 illustrates an example where the relative speed between the dump truck 1 and the object or the travel speed V of the dump truck 1 increases, and accordingly the dimension L of the specific detection area SD is increased. FIG. 14 illustrates an example where the relative speed between the dump truck 1 and the object or the travel speed of the dump truck 1 reduces, and accordingly the dimension L of the specific detection area SD is reduced. The dimension L correlates with the relative speed between the dump truck 1 and the object or the travel speed V of the dump truck 1.

The steering angle detection device 10B can detect the travel direction of the dump truck 1 by detecting the detected steering angle θs of the steering device 14. The specific detection area setting unit 37 alters the shape of the specific detection area SD based on the detected steering angle data of the steering device 14 detected by the steering angle detection device 10B. The specific detection area setting unit 37 bends the specific detection area SD to the left when having determined that the dump truck 1 turns to the left based on the detected steering angle data detected by the steering angle detection device 10B. The specific detection area setting unit 37 bends the specific detection area SD to the right when having determined that the dump truck 1 turns to the right based on the detected steering angle data detected by the steering angle detection device 10B.

Figure 15:
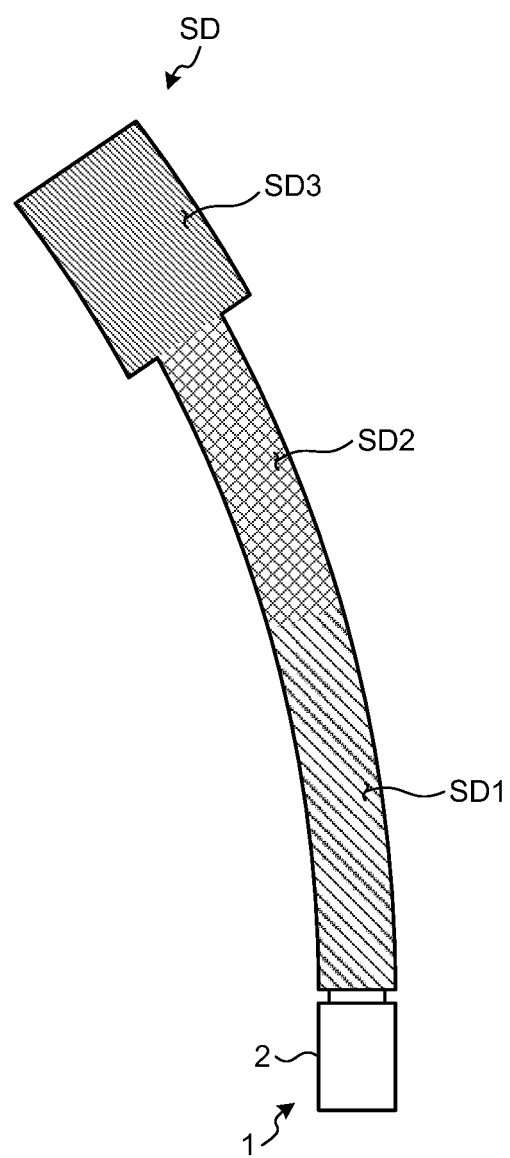
FIG. 15 is a diagram illustrating an example of the specific detection area according to the embodiment.
Figure 16:
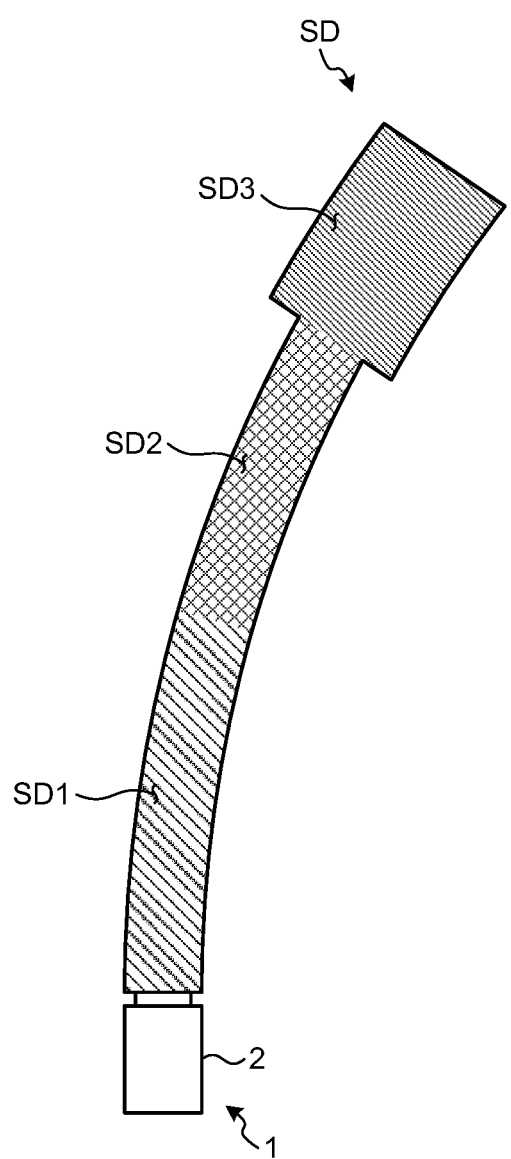
FIG. 16 is a diagram illustrating an example of the specific detection area according to the embodiment.

FIG. 15 illustrates an example where the dump truck 1 turns to the left and the specific detection area SD is bent to the left. FIG. 16 illustrates an example where the dump truck 1 turns to the right and the specific detection area SD is bent to the right. As illustrated in FIG. 15, when the steering device 14 has been operated to turn the dump truck 1 to the left, the specific detection area setting unit 37 bends the shape of the specific detection area SD based on the detected steering angle data detected by the steering angle detection device 10B such that a distal end of the specific detection area SD (a distal end of the third section SD3) moves to the left with respect to the dump truck 1. As illustrated in FIG. 16, when the steering device 14 has been operated to turn the dump truck 1 to the right, the specific detection area setting unit 37 bends the shape of the specific detection area SD based on the detected steering angle data detected by the steering angle detection device 10B such that the distal end of the specific detection area SD (the distal end of the third section SD3) moves to the right with respect to the dump truck 1. The degree of the bend of the shape of the specific detection area SD correlates with the detected steering angle θs of the steering device 14 detected by the steering angle detection device 10B.

The relative position between a proximal end of the specific detection area SD (a proximal end of the first section SD1) and the dump truck 1 does not change. When changing the dimension L of the specific detection area SD, the specific detection area setting unit 37 does not change the relative position between the proximal end of the specific detection area SD and the dump truck 1, and changes the position of the distal end of the specific detection area SD in the travel direction of the dump truck 1. For example, when reducing the dimension L of the specific detection area SD, the specific detection area setting unit 37 does not change the relative position between the proximal end of the specific detection area SD and the dump truck 1, and changes the relative position between the distal end of the specific detection area SD and the dump truck 1 such that the distal end of the specific detection area SD moves toward the dump truck 1. When increasing the dimension L of the specific detection area SD, the specific detection area setting unit 37 does not change the relative position between the proximal end of the specific detection area SD and the dump truck 1, and changes the relative position between the distal end of the specific detection area SD and the dump truck 1 such that the distal end of the specific detection area SD moves away from the dump truck 1.

Moreover, when bending the specific detection area SD, the specific detection area setting unit 37 does not change the relative position between the proximal end of the specific detection area SD and the dump truck 1, and changes the position of the distal end of the specific detection area SD in the vehicle width direction of the dump truck 1. For example, when bending the specific detection area SD to the left, the specific detection area setting unit 37 does not change the relative position between the proximal end of the specific detection area SD and the dump truck 1, and changes the relative position between the distal end of the specific detection area SD and the dump truck 1 such that the distal end of the specific detection area SD moves to the left with respect to the dump truck 1. When bending the specific detection area SD to the right, the specific detection area setting unit 37 does not change the relative position between the proximal end of the specific detection area SD and the dump truck 1, and changes the relative position between the distal end of the specific detection area SD and the dump truck 1 such that the distal end of the specific detection area SD moves to the right with respect to the dump truck 1.

The proximal end of the specific detection area SD indicates an end of the specific detection area SD that is closest to the dump truck 1 with respect to the travel direction of the dump truck 1. The distal end of the specific detection area SD indicates an end of the specific detection area SD that is farthest from the dump truck 1 with respect to the travel direction of the dump truck 1. The proximal end of the specific detection area SD includes the proximal end of the first section SD1. The distal end of the specific detection area SD includes the distal end of the third section SD3. In the embodiment, the specific detection area SD is set such that the proximal end of the specific detection area SD is connected (adjacent) to the front of the dump truck 1.

Figure 17:
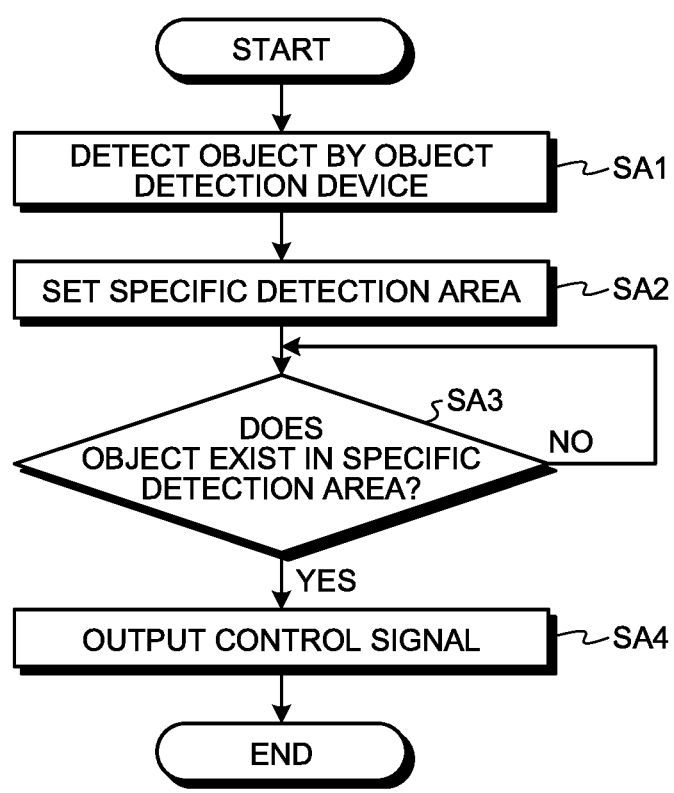
FIG. 17 is a flowchart illustrating an example of a method for controlling the dimensions of the specific detection area according to the embodiment.

Next, an example of the collision damage reduction method of the dump truck 1 according to the embodiment is described with reference to a flowchart of FIG. 17.

The object detection device 12 provided to the dump truck 1 detects an object ahead of the dump truck 1 (step SA1).

The detection data of the object detection device 12 is supplied to the specific detection area setting unit 37. The specific detection area setting unit 37 determines, based on the detection data of the object detection device 12, whether or not to set the specific detection area SD in the detection area SL.

Figure 18:
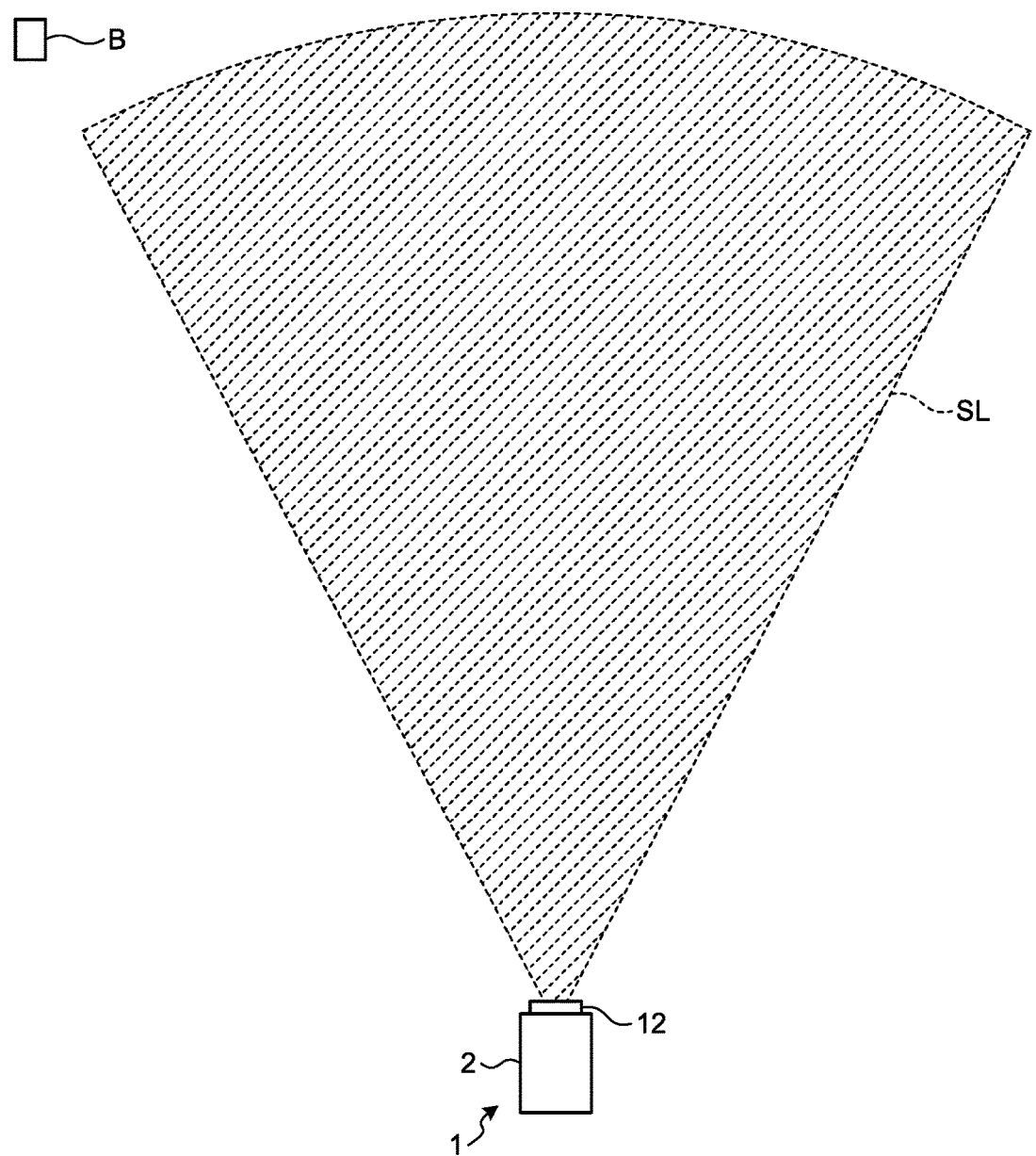
FIG. 18 is a schematic diagram illustrating an example of a method for controlling the travel vehicle according to the embodiment.

FIG. 18 is a schematic diagram illustrating an example of the positional relationship between an object B and the detection area SL. The object B may be another dump truck 1 existing ahead of the dump truck 1, or a vehicle different from a dump truck. FIG. 18 illustrates an example where the object B exists outside the detection area SL of the object detection device 12. As illustrated in FIG. 18, if the object B exists outside the detection area SL, the specific detection area setting unit 37 determines not to set the specific detection area SD.

Figure 19:
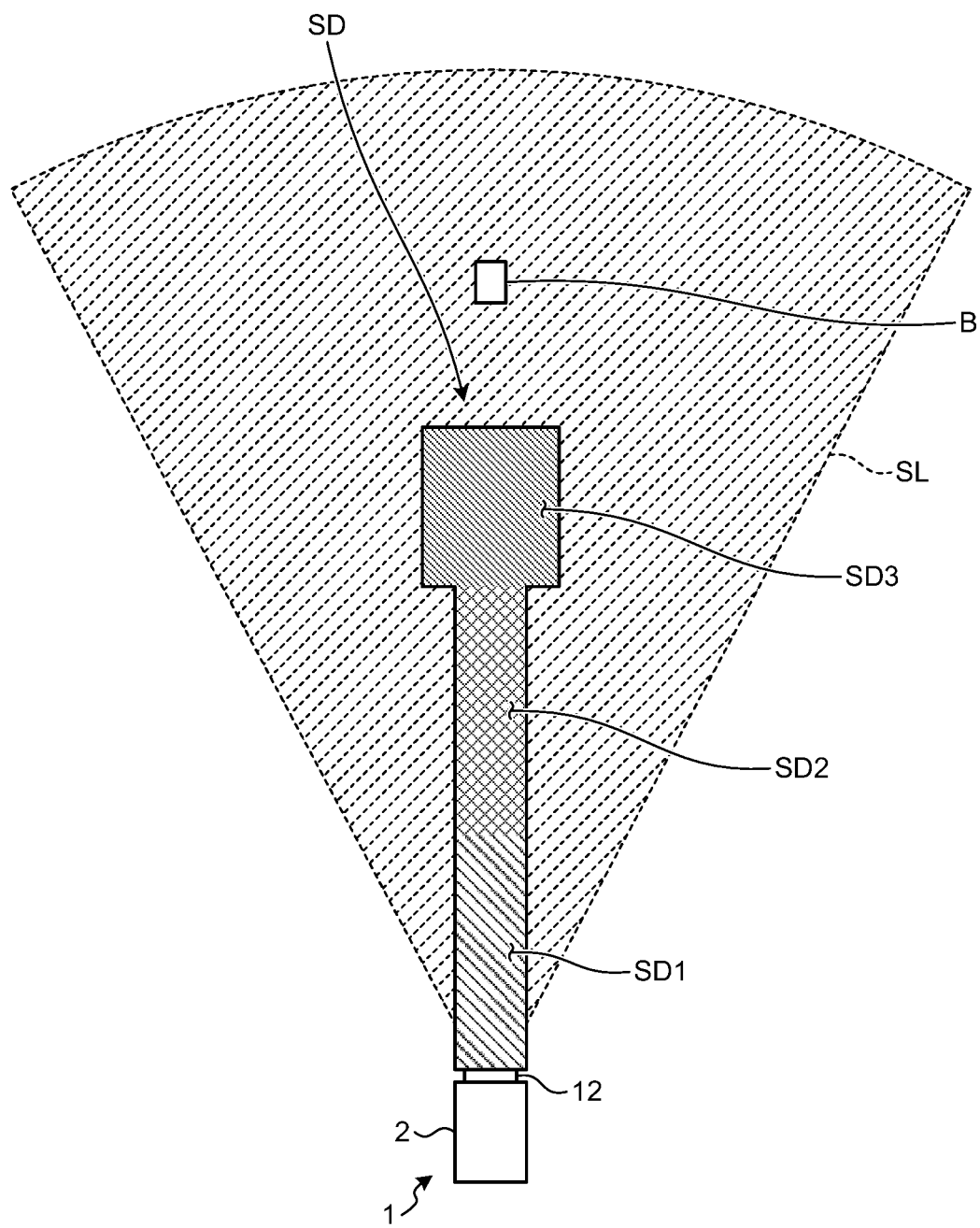
FIG. 19 is a schematic diagram illustrating an example of the method for controlling the travel vehicle according to the embodiment.

FIG. 19 is a schematic diagram illustrating an example of the positional relationship between the object B and the detection area SL. FIG. 19 illustrates an example where the object B exists inside the detection area SL of the object detection device 12. As illustrated in FIG. 19, if the object B exists inside the detection area SL, the specific detection area setting unit 37 determines to set the specific detection area SD.

If having determined, based on the detection data of the object detection device 12, that the object B exists inside the detection area SL, the specific detection area setting unit 37 sets the specific detection area SD inside the detection area SL (step SA2).

The determination unit 35 determines, based on the detection data of the object detection device 12, whether or not the object B exists in the specific detection area SD (step SA3).

Figure 20:
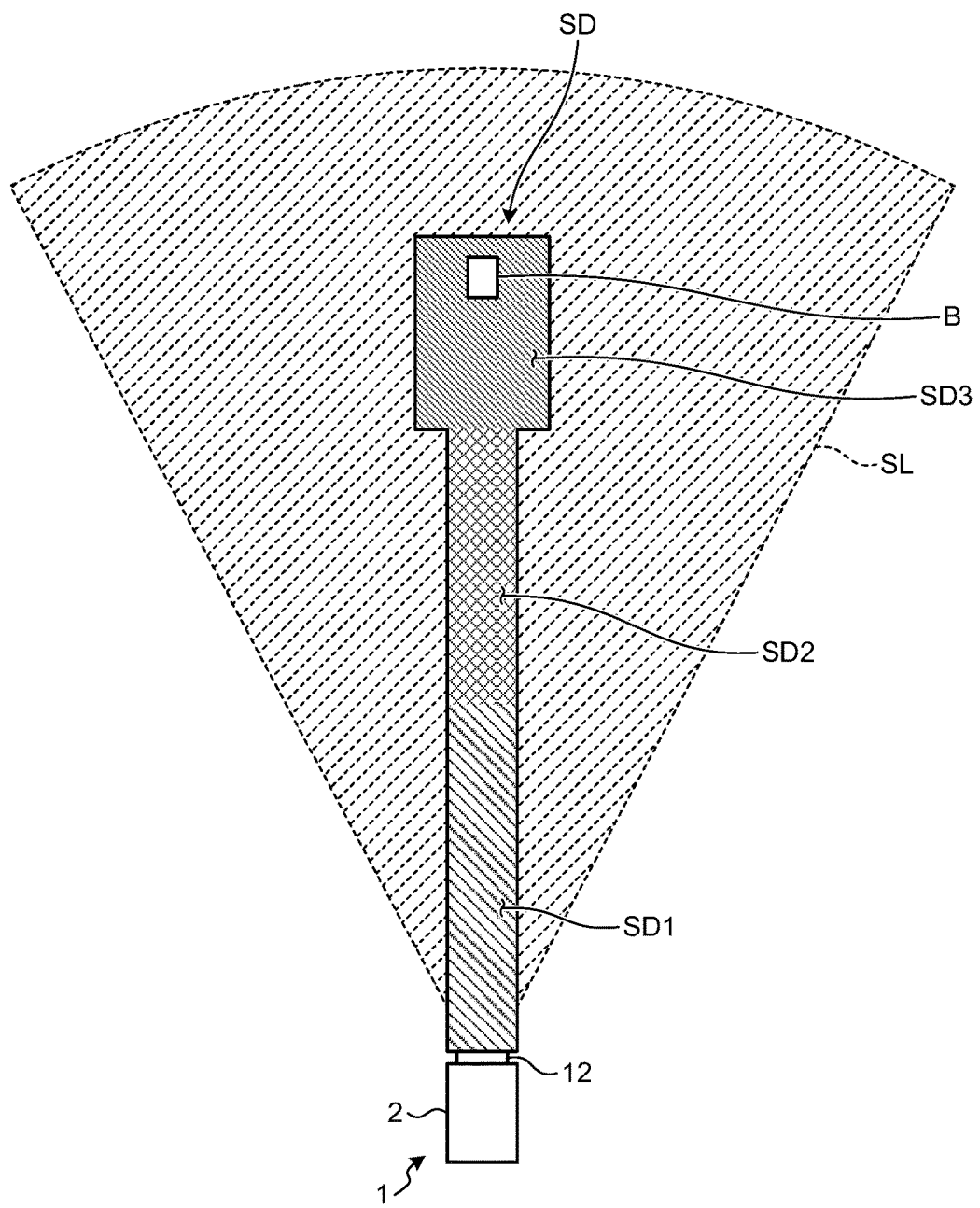
FIG. 20 is a schematic diagram illustrating an example of the method for controlling the travel vehicle according to the embodiment.

FIG. 19 illustrates an example where although the object B exists inside the detection area SL, the object B does not exist in the specific detection area SD. FIG. 20 illustrates an example where the object B exists in the specific detection area SD.

If it has been determined in step SA3 that the object B does not exist in the specific detection area SD (step SA3: No), the control unit 36 does not output the control signal C. In other words, in the embodiment, even if the object B exists in the detection area SL, when the object B does not exist in the specific detection area SD, the control signal C is not output from the control unit 36, and the processing system 600 does not operate.

If it has been determined in step SA3 that the object B exists in the specific detection area SD (step SA3: Yes), the control unit 36 outputs, to the processing system 600, the control signal C for reducing damage from a collision (step SA4).

For example, the control unit 36 outputs the control signal C2 to the brake device 13. Consequently, the brake device 13 operates, and accordingly damage from a collision between the object B and the dump truck 1 is reduced. The control unit 36 may output the control signal C1 to the power generation device 22 to reduce the travel speed V of the dump truck 1. The control unit 36 may output the control signal C3 to the steering device 14 to change the travel direction of the dump truck 1 for the purpose of avoiding a collision between the object B and the dump truck 1. The control unit 36 may output the control signal C4 to the retarder 28 to reduce the travel speed V of the dump truck 1. The control unit 36 may output the control signal C5 to the display device 20 or output the control signal C6 to the warning device 21 to draw the driver WM's attention.

According to the collision damage reduction method according to the embodiment, the specific detection area SD, which is smaller than the detection area SL, is set inside the detection area SL. It is determined whether or not the object B exists in the specific detection area SD. If it has been determined that the object B exists in the specific detection area SD, the control signal C for operating the processing system 600 is output. Consequently, as illustrated in, for example, FIG. 19, even if the object B having a small possibility of a collision with the dump truck 1 exists in the detection area SL of the object detection device 12, when the object B does not exist in the specific detection area SD, the control signal C is not output, and accordingly the processing system 600 does not operate. Hence, the travel of the dump truck 1 is prevented from being restricted excessively. Therefore, a reduction in the work efficiency of the dump truck 1 and a reduction in productivity at the mining site are prevented.

[Calibration of Detected Steering Angle Data]

Next, a method for calibrating the detected steering angle data according to the embodiment is described. As described above, in the embodiment, the shape of the specific detection area SD is changed based on the detected steering angle data detected by the steering angle detection device 10B. Hence, if the detection accuracy of the steering angle detection device 10B reduces, and the detected steering angle data detected by the steering angle detection device 10B includes an error, there may occur a difference between the degree of a bend of the specific detection area SD and a target degree of the bend. If the degree of the bend of the specific detection area SD is different from the target degree of the bend, there may arise a situation where although it is a situation where the possibility of a collision between the dump truck 1 and the object B is high so that, essentially, the processing system 600 needs to operate, the object B is not located in the specific detection area SD so that the processing system 600 does not operate. Moreover, there may arise a situation where although the possibility of a collision between the dump truck 1 and the object B is low so that, essentially, the processing system 600 does not need to operate, the object B is located in the specific detection area SD so that the processing system 600 operates unnecessarily.

As described with reference to FIG. 9 and the like, in the embodiment, the steering angle detection device 10B includes the potentiometer 143. When the voltage value output from the potentiometer 143 is $0.5\alpha$ [V], it is determined that the steering angle θ of the steering device 14 is 0 [°]. However, due to the error of the steering angle detection device 10B, there is a possibility where the true steering angle θ is 0 [°], but the voltage value output from the potentiometer 143 does not indicate $0.5\alpha$ [V] so that a difference occurs between the true steering angle θ and the detected steering angle θs. Moreover, there is a possibility where the true steering angle θ is not 0 [°] but the voltage value output from the potentiometer 143 indicates $0.5\alpha$ [V] so that a difference occurs between the true steering angle θ and the detected steering angle θs.

Figure 21:
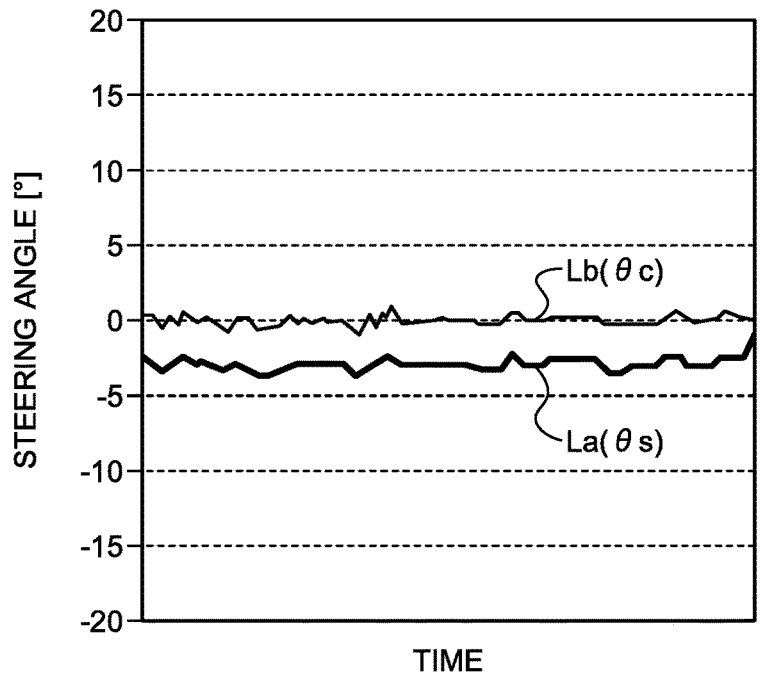
FIG. 21 is a schematic diagram illustrating an example of the method for controlling the travel vehicle according to the embodiment.

FIG. 21 is a diagram illustrating the relationship between the detected steering angle data that was detected by the steering angle detection device 10B when the dump truck 1 traveled in the straight ahead state in a test course on a flat, and the time. In FIG. 21, the horizontal axis represents the time, and the vertical axis represents the steering angle θ. In FIG. 21, a line La represents the detected steering angle θs detected by the steering angle detection device 10B. As illustrated in FIG. 21, there is a case where although, essentially, the detected steering angle θs needs to indicate 0 [°], the error of the steering angle detection device 10B causes the detected steering angle θs to indicate values of −2 [°] to −3 [°].

Examples of a cause of the error of the detected steering angle data include a manufacturing error of the steering angle detection device 10B. Moreover, as described above, the steering angle detection device 10B according to the embodiment includes the contact potentiometer 143 where the resistance plate 143A and the wiper 143B rub against each other. Hence, examples of a cause of the error of the detected steering angle data include deterioration of the detection accuracy of the potentiometer 143 resulting from the friction between the resistance plate 143A and the wiper 143B.

Hence, in the embodiment, the control device 30 uses the attitude data of the vehicle body 5 detected by the attitude detection device 10C to correct the detected steering angle data of the steering angle detection device 10B.

Figure 22:
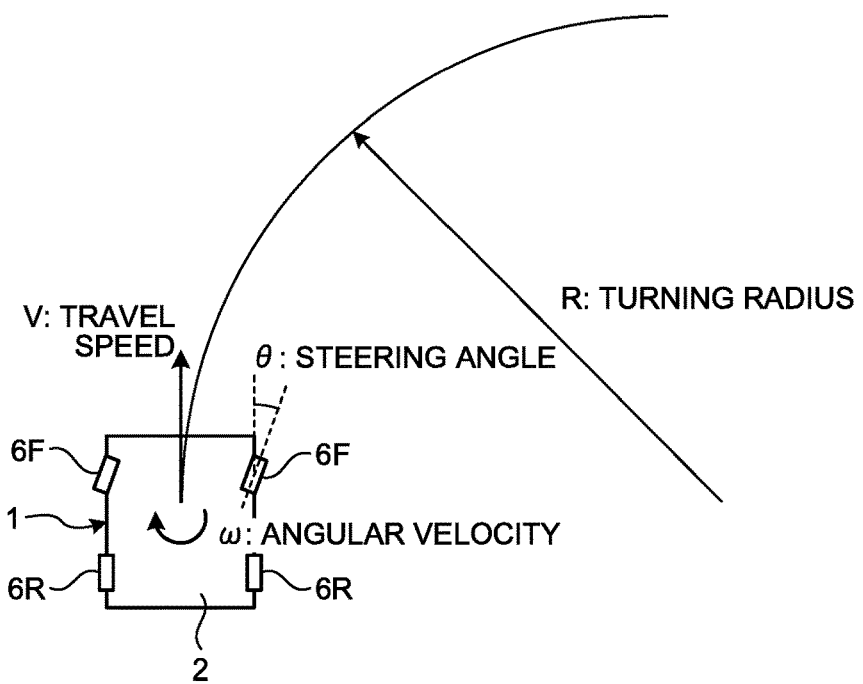
FIG. 22 is a schematic diagram illustrating an example of the method for controlling the travel vehicle according to the embodiment.

FIG. 22 is a schematic diagram for explaining a method for correcting the detected steering angle data of the steering device 14, using the attitude data of the vehicle body 5 detected by the attitude detection device 10C.

In FIG. 22, the travel speed detection device 10A detects the travel speed V of the dump truck 1. The attitude detection device 10C detects the angular velocity ω indicating the yaw rate of the dump truck 1. The turn data calculation unit 32 calculates the turning radius data indicating the turning radius R of the vehicle body 5 based on the yaw rate data indicating the angular velocity ω and the travel speed data indicating the travel speed V. In the embodiment, the turn data calculation unit 32 performs a computation of the following equation (1) and calculates the turning radius R.

$$R = V/\omega \quad (1)$$

The turn data calculation unit 32 performs a computation of the following equation (2) based on the turning radius R calculated by equation (1) and calculates the calculated steering angle θc.

$$\theta c = R \times \beta \quad (2)$$

β is a preset coefficient, and is stored in the storage unit 38. The turn data calculation unit 32 performs the computation of equation (2) and calculates the calculated steering angle θc from the turning radius R. In the embodiment, the turn data of the vehicle body 5 includes the turning radius data indicating the turning radius R, and the calculated steering angle data indicating the calculated steering angle θc calculated from the turning radius R.

The steering angle data correction unit 33 calculates the first correction data on the detected steering angle data based on the detected steering angle data indicating the detected steering angle θs detected by the steering angle detection device 10B, and the calculated steering angle data indicating the calculated steering angle θc calculated by the turn data calculation unit 32. In the embodiment, the first correction data is a difference Δθ between the detected steering angle θs and the calculated steering angle θc.

In FIG. 21, a line Lb represents the calculated steering angle θc calculated by the turn data calculation unit 32. As illustrated in FIG. 21, the detected steering angle θs deviates from 0 [°] when the dump truck 1 traveled in the straight ahead state in the test course on the flat while the calculated steering angle θc indicates approximately 0 [°]. Therefore, the calculated steering angle θc calculated based on the yaw rate data detected by the attitude detection device 10C is used to correct the detected steering angle θs. Accordingly, the error of the detected steering angle θs detected by the steering angle detection device 10B is reduced.

According to the findings of the present inventor, the difference between the calculated steering angle θc calculated from the yaw rate data that was detected by the attitude detection device 10C when the travel speed V of the dump truck 1 was high and the true steering angle θ was small. On the other hand, the difference between the calculated steering angle θc calculated from the yaw rate data that was detected by the attitude detection device 10C when the travel speed V of the dump truck 1 was low and the true steering angle was large. In other words, an error of the calculated steering angle θc that is calculated from the yaw rate data when the dump truck 1 travels at high speed is small, and an error of the calculated steering angle θc that is calculated from the yaw rate data when the dump truck 1 travels at low speed is large. This is considered to be caused by the following reasons.

The travel speed V of the dump truck 1 detected by the travel speed detection device 10A is considered to include a true travel speed component Vt and an error component Ve (V=Vt+Ve). The value of the error component Ve is considered to be ascribable to the characteristics of the travel speed detection device 10A including the rotational speed sensor. Hence, the error component Ve is considered to be constant irrespective of the value of the true travel speed component Vt of the dump truck 1. Therefore, if the travel speed component Vt is large, that is, if the dump truck 1 travels at high speed, the influence of the error component Ve given to the travel speed V is small. On the other hand, if the travel speed component Vt is small, that is, if the dump truck 1 travels at low speed, the influence of the error component Ve given to the travel speed V is large. Hence, errors of the turning radius R and the calculated steering angle θc that are calculated from the travel speed V and the angular velocity ω are considered to increase with decreasing travel speed V of the dump truck 1.

Hence, in the embodiment, the steering angle data correction unit 33 calculates the first correction data based on the calculated steering angle data calculated from the yaw rate data that is detected by the attitude detection device 10C when the travel speed data detected by the travel speed detection device 10A is equal to or more than a threshold. The threshold of the travel speed data is a preset value, and is stored in the storage unit 38. In the embodiment, the threshold of the travel speed data is 10 [km/h]. In other words, in the embodiment, the steering angle data correction unit 33 calculates the first correction data based on the calculated steering angle data calculated from the yaw rate data that is detected when the dump truck 1 travels at a travel speed equal to or more than 10 [km/h].

Moreover, the yaw rate data detected by the attitude detection device 10C may also include an error. In the embodiment, the attitude data correction unit 34 calculates the second correction data on the yaw rate data, based on the yaw rate data that is detected by the attitude detection device 10C when the travel speed data detected by the travel speed detection device 10A is zero.

Figure 23:
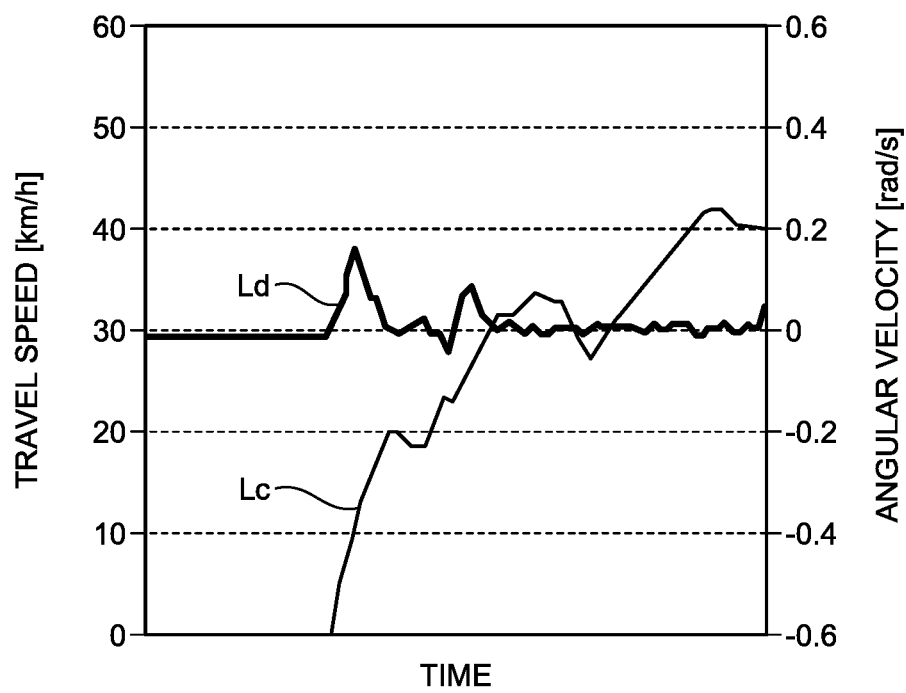
FIG. 23 is a schematic diagram illustrating an example of the method for controlling the travel vehicle according to the embodiment.

FIG. 23 is a diagram for explaining a method for calculating the second correction data on the yaw rate data. In FIG. 23, the horizontal axis represents the time, and the vertical axes represent the travel speed V and the angular velocity ω. In FIG. 23, a line Lc represents the travel speed V, and a line Ld represents the angular velocity ω. When the travel speed V is zero, that is, when the dump truck 1 is at rest, the angular velocity ω detected by the attitude detection device 10C is essentially 0 [rad/s]. However, as illustrated in FIG. 23, there is a case where although the travel speed V of the dump truck 1 is zero, the angular velocity ω detected by the attitude detection device 10C indicates a value deviating from 0 [rad/s].

The attitude data correction unit 34 calculates the second correction data on the yaw rate data, based on the yaw rate data that is detected by the attitude detection device 10C when the dump truck 1 is at rest and the travel speed V is zero. In the embodiment, the second correction data is a difference Δω between 0 [rad/s] and the angular velocity ω [rad/s] detected by the attitude detection device 10C.

Figure 24:
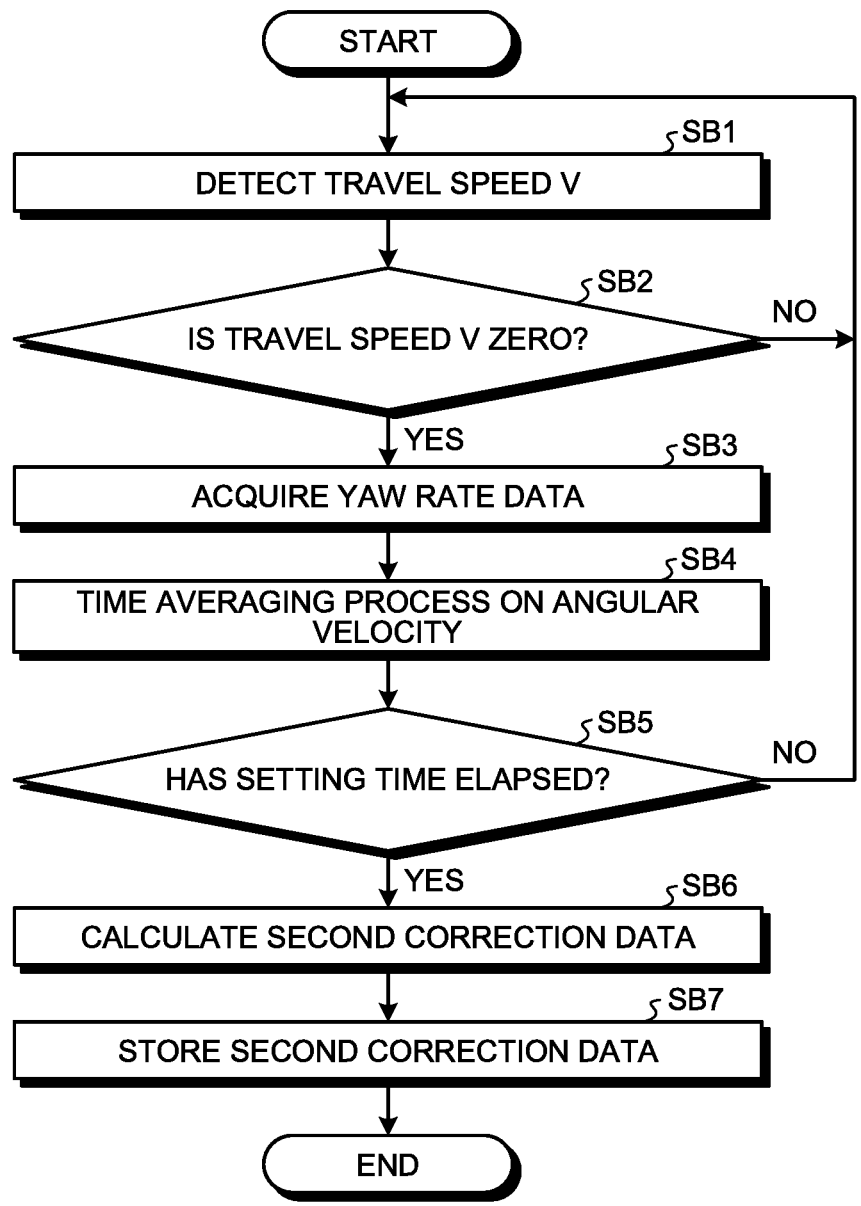
FIG. 24 is a flowchart illustrating an example of the method for controlling the travel vehicle according to the embodiment.
Figure 25:
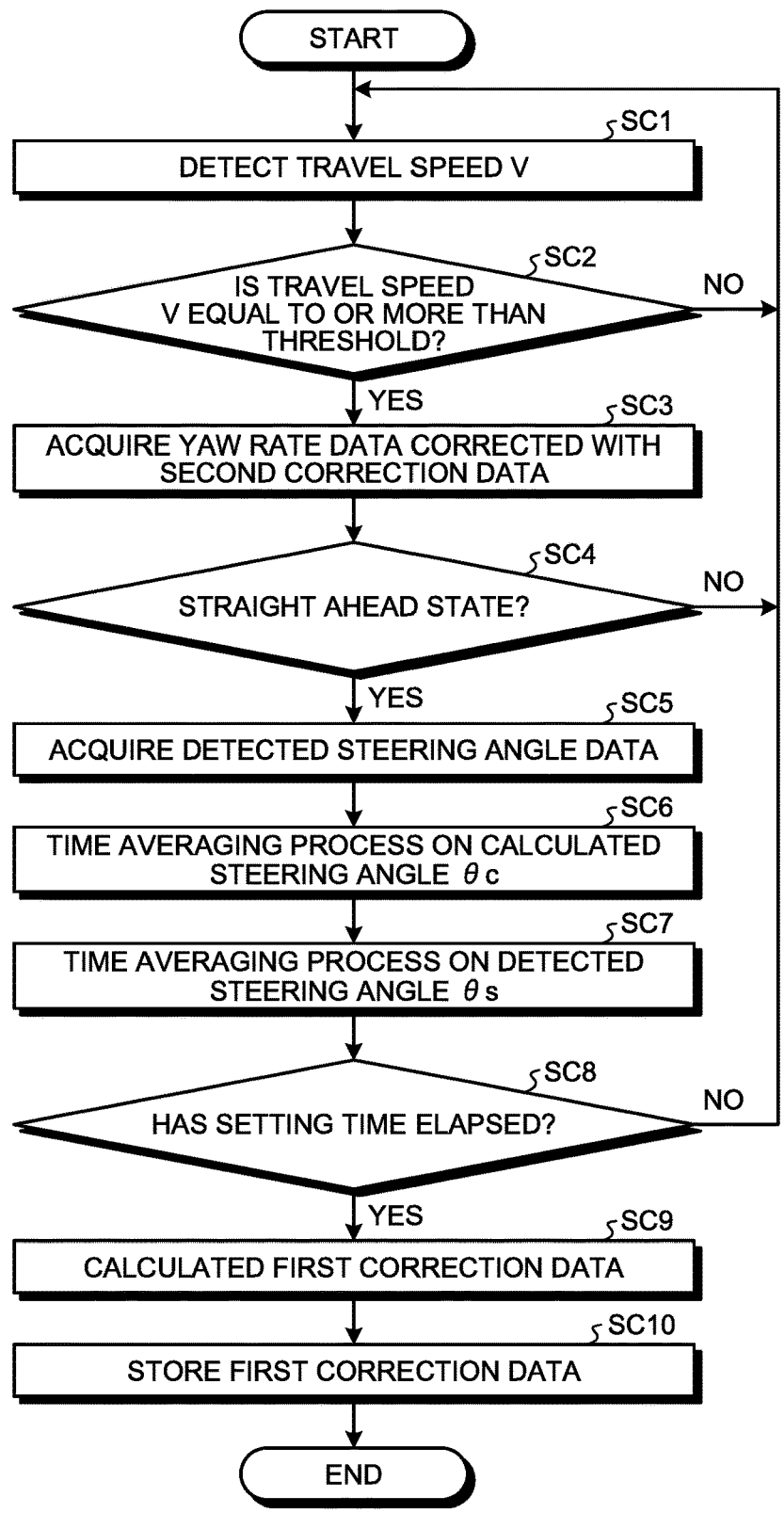
FIG. 25 is a flowchart illustrating an example of the method for controlling the travel vehicle according to the embodiment.

Next, a calibration method according to the embodiment is described with reference to flowcharts of FIGS. 24 and 25. FIG. 24 is a flowchart illustrating the method for calculating the second correction data on the attitude data. FIG. 25 is a flowchart illustrating a method for calculating the first correction data on the detected steering angle data.

The method for calculating the second correction data on the attitude data is described with reference to FIG. 24. A process of calculating the second correction data is automatically performed by the control device 30, for example, before the operation of the dump truck 1.

The travel speed detection device 10A detects the travel speed V of the dump truck 1 (step SB1). The attitude data correction unit 34 determines whether or not the travel speed V of the dump truck 1 is zero (step SB2).

If it has been determined in step SB2 that the travel speed V of the dump truck 1 is not zero (step SB2: No), the second correction data is not calculated to return to the execution of step SB1.

If it has been determined in step SB2 that the travel speed V of the dump truck 1 is zero (step SB2: Yes), the attitude data correction unit 34 acquires the yaw rate data indicating the angular velocity ω of the vehicle body 5 detected by the attitude detection device 10C (step SB3). The attitude data correction unit 34 acquires the yaw rate data from the attitude detection device 10C at preset sampling intervals (for example, at intervals of 50 [msec]).

The attitude data correction unit 34 performs a time averaging process on the acquired yaw rate data indicating the angular velocity ω (step SB4). In other words, the attitude data correction unit 34 divides the sum of the acquired yaw rate data by the number of samples.

The attitude data correction unit 34 acquires the yaw rate data for a predetermined setting time at the preset sampling intervals. The attitude data correction unit 34 determines whether or not the time elapsed from the start of acquisition of the yaw rate data exceeds the setting time (step SB5).

If it has been determined in step SB5 that the time elapsed from the start of acquisition of the yaw rate data in the state where the travel speed V is zero does not exceed the setting time (step SB5: No), the second correction data is not calculated to return to the execution of step SB1.

If it has been determined in step SB5 that the time elapsed from the start of acquisition of the yaw rate data in the state where the travel speed V is zero exceeds the setting time (step SB5: Yes), the attitude data correction unit 34 calculates a time average of the angular velocity ω.

The attitude data correction unit 34 calculates the second correction data Δω on the yaw rate data (step SB6). In the embodiment, the second correction data Δω is a difference between 0 [rad/s] and the time average of the angular velocity ω calculated after step SB5.

The second correction data Δω calculated by the attitude data correction unit 34 is stored in the storage unit 38 (step SB7).

Next, the method for calculating the first correction data on the detected steering angle data is described with reference to FIG. 25. A process of calculating the first correction data is automatically performed by the control device 30, for example, while the dump truck 1 is operating (traveling in the mine).

The travel speed detection device 10A detects the travel speed V of the dump truck 1 (step SC1). The steering angle data correction unit 33 determines whether or not the travel speed V of the dump truck 1 is equal to or more than the threshold (step SC2). As described above, in the embodiment, the threshold of the travel speed V is 10 [km/h].

If it has been determined in step SC2 that the travel speed V of the dump truck 1 is not equal to or more than the threshold (step SC2: No), the first correction data is not calculated to return to the execution of step SC1.

If it has been determined in step SBC that the travel speed V of the dump truck 1 is equal to or more than the threshold (step SC2: Yes), the steering angle data correction unit 34 acquires the yaw rate data indicating the angular velocity ω of the vehicle body 5 that is detected by the attitude detection device 10C and is corrected with the second correction data (step SC3). The yaw rate data corrected with the second correction data is the sum of the angular velocity ω detected by the attitude detection device 10C and the second correction data Δω.

The steering angle data correction unit 33 acquires the yaw rate data corrected with the second correction data from the attitude detection device 10C via the attitude data correction unit 34 at preset sampling intervals (for example, at intervals of 50 [msec]).

The steering angle data correction unit 33 determines whether or not the dump truck 1 is traveling in the straight ahead state based on the yaw rate data corrected with the second correction data (step SC4). When having determined that the angular velocity ω corrected with the second correction data is 0 [rad/s], or when having determined that the absolute value of the angular velocity ω corrected with the second correction data is equal to or less than a predetermined threshold, the steering angle data correction unit 33 determines that the dump truck 1 is traveling in the straight ahead state.

If it has been determined in step SC4 that the dump truck 1 is not traveling in the straight ahead state (step SC4: No), the first correction data is not calculated to return to the execution of step SC1.

If it has been determined in step SC4 that the dump truck 1 is traveling in the straight ahead state (step SC4: Yes), the steering angle data correction unit 33 acquires the detected steering angle data indicating the detected steering angle θs of the steering device 14 detected by the steering angle detection device 10B (step SC5). The steering angle data correction unit 33 acquires the detected steering angle data from the steering angle detection device 10B at preset sampling intervals (for example, at intervals of 50 [msec]).

The turn data calculation unit 32 performs the computations of the above-mentioned equations (1) and (2) based on the travel speed data of the dump truck 1 and the yaw rate data corrected with the second correction data, and calculates the calculated steering angle θc. The turn data calculation unit 32 calculates the calculated steering angle data at the preset sampling intervals based on each piece of the yaw rate data acquired at the sampling intervals. Moreover, the turn data calculation unit 32 performs the time averaging process on the calculated steering angle data indicating the calculated steering angle θc calculated (step SC6). In other words, the turn data calculation unit 32 divides the sum of the acquired calculated steering angle data by the number of samples.

Moreover, the steering angle data correction unit 33 performs the time averaging process on the detected steering angle data indicating the detected steering angle θs detected by the steering angle detection device 10B at the preset sampling intervals (step SC7). In other words, the steering angle data correction unit 33 divides the sum of the acquired detected steering angle data by the number of samples.

The steering angle data correction unit 33 acquires the calculated steering angle data and the detected steering angle data for a predetermined setting time at the preset sampling intervals. The steering angle data correction unit 33 determines whether or not the time elapsed from the start of acquisition of the calculated steering angle data and the detected steering angle data exceeds the setting time (step SC8).

If it has been determined in step SC8 that the time elapsed from the start of acquisition of the calculated steering angle data and the detected steering angle data in the state where the travel speed V is equal to or more than the threshold does not exceed the setting time (step SC8: No), the first correction data is not calculated to return to the execution of step SC1.

If it has been determined in step SC8 that the time elapsed from the start of acquisition of the calculated steering angle data and the detected steering angle data in the state where the travel speed V is equal to or more than the threshold exceeds the setting time (step SC8: Yes), the steering angle data correction unit 33 calculates a time average of the calculated steering angle θc and a time average of the detected steering angle θs.

The steering angle data correction unit 33 calculates the first correction data Δθ on the detected steering angle data (step SC9). In the embodiment, the first correction data Δθ is a difference between the time average of the calculated steering angle θc and the time average of the detected steering angle θs, the time averages having been calculated after step SC8.

The first correction data Δθ calculated by the steering angle data correction unit 33 is stored in the storage unit 38 (step SC10).

The first correction data Δθ calculated by the steering angle data correction unit 33 is reflected in a change in the shape of the specific detection area SD. When bending the specific detection area SD based on the detected steering angle θs detected by the steering angle detection device 10B, the specific detection area setting unit 37 changes the shape of the specific detection area SD based on the detected steering angle data corrected with the first correction data Δθ. The detected steering angle data corrected with the first correction data is the sum of the detected steering angle θs detected by the steering angle detection device 10B and the first correction data Δθ.

[Operation and Effect]

As described above, according to the embodiment, the turn data of the vehicle body 5 is calculated based on the attitude data of the vehicle body 5 detected by the attitude detection device 10C and the travel speed data of the travel device 4 detected by the travel speed detection device 10A. The detected steering angle data of the steering device 14 detected by the steering angle detection device 10B is corrected based on the turn data of the vehicle body 5. Accordingly, an error of the detected steering angle data is reduced. The turn data of the vehicle body 5 includes the turning radius data and the calculated steering angle data that are derived by the computation processes based on the attitude data of the vehicle body 5 detected by the inertial measurement unit with high measurement accuracy. Hence, the turn data of the vehicle body 5 is used to correct the detected steering angle data. Accordingly, the error of the detected steering angle data is sufficiently reduced.

In the embodiment, the steering angle detection device 10B includes the potentiometer 143. As described with reference to FIG. 9, the detection data of the potentiometer 143 has high linearity. Hence, the potentiometer 143 can detect the detected steering angle θs of the steering device 14 accurately in a wide range. On the other hand, the detection data of the contact potentiometer 143 may be offset due to the friction between the resistance plate 143A and the wiper 143B. In other words, the potentiometer 143 has a characteristic of having high linearity but having a possibility to offset its detection data. In the embodiment, it is effective for the correction of the detected steering angle data detected by the steering angle detection device 10B including the potentiometer 143.

Moreover, in the embodiment, the yaw rate data of the vehicle body 5 is detected by the attitude detection device 10C including the inertial measurement unit. The calculated steering angle data is calculated based on the yaw rate data and the travel speed data. Therefore, the steering angle data correction unit 33 can calculate the first correction data Δθ smoothly from the difference between the calculated steering angle data calculated and the detected steering angle data.

Moreover, the inertial measurement unit of the attitude detection device 10C has high measurement accuracy. However, an error of the calculated steering angle θc calculated from the yaw rate data that is detected by the inertial measurement unit provided to the vehicle body 5 in a state where the dump truck 1 is traveling at low speed is highly likely to be large. According to the embodiment, the steering angle data correction unit 33 calculates the first correction data Δθ based on the calculated steering angle data calculated from the yaw rate data that is detected when the dump truck 1 is traveling at high speed and the travel speed data is equal to or more than the threshold. Therefore, the error of the detected steering angle θs can be sufficiently reduced using the first correction data Δθ.

Moreover, the attitude data detected by the attitude detection device 10C may include an error. According to the embodiment, the second correction data Δω on the yaw rate data is calculated based on the yaw rate data that is detected by the attitude detection device 10C when the travel speed data is zero. Consequently, the error of the calculated steering angle θc can be sufficiently reduced using the second correction data Δω.

Moreover, according to the embodiment, the specific detection area SD, which is smaller than the detection area SL of the object detection device 12, is set in the detection area SL. When the object B exists in the specific detection area SD, the processing system 600 operates. The specific detection area SD is bent in conjunction with a change in the travel direction of the dump truck 1 based on the detected steering angle data detected by the steering angle detection device 10B. Consequently, the excessive operation of the processing system 600 is prevented. A reduction in the work efficiency of the dump truck 1 and a reduction in productivity at the mining site are prevented. Moreover, in the embodiment, the specific detection area setting unit 37 bends the specific detection area SD based on the detected steering angle data corrected with the first correction data. Consequently, the specific detection area setting unit 37 can alter the shape of the specific detection area SD appropriately in such a manner as to reduce damage from a collision between the dump truck 1 and the object B.

In the above-mentioned embodiment, it is assumed that the attitude detection device 10C includes the inertial measurement unit, the attitude data includes the yaw rate data of the vehicle body 5, and the turn data of the vehicle body 5 includes the turning radius data and calculated steering angle data that are calculated from the yaw rate data. The attitude detection device 10C may include a GPS (Global Positioning System) receiver mounted on the vehicle body 5. The GPS receiver detects the absolute position of the vehicle body 5. The GPS receiver detects the orientation of the vehicle body 5 (the travel direction of the dump truck 1), the turning radius R of the dump truck 1, and the travel speed V of the dump truck 1. In other words, the GPS receiver can achieve the functions of the travel speed detection device 10A that can detect the travel speed V of the dump truck 1, the attitude detection device 10C that can detect the travel direction and turning radius R of the dump truck 1, and the turn data calculation unit 32 that can calculate the calculated steering angle θc from the turning radius R. The steering angle data correction unit 33 may calculate the first correction data based on the detected steering angle data detected by the steering angle detection device 10B, and the turn data detected by the GPS receiver.

In the above-mentioned embodiments, the dump truck 1 may be used not only at a mining site of a mine but also, for example, a dam construction site.

In the above-mentioned embodiment, the travel vehicle 1 is assumed to be the dump truck 1. The travel vehicle 1 may be a work vehicle such as a wheel loader.

In the above-mentioned embodiment, it is assumed that the shape of the specific detection area SD is changed based on the detected steering angle data corrected with the first correction data. The components of the above-mentioned embodiment can be widely applied to technical fields challenging to detect the travel direction of the travel vehicle 1 with high accuracy based on the detected steering angle data of the steering angle detection device 10B. For example, the components of the above-mentioned embodiment are mounted on the travel vehicle 1 on which a system for detecting the drowsiness of the driver WM is mounted. Accordingly, unsteadiness of the travel direction of the travel vehicle 1 can be detected with high accuracy based on the detected steering angle data of the steering angle detection device 10B. When the driver WM becomes drowsy, the travel direction of the travel vehicle 1 is highly likely to become unsteady. The components of the above-mentioned embodiment are mounted on the travel vehicle 1. Accordingly, the drowsiness of the driver WM can be detected with high accuracy.

In the above-mentioned embodiment, the travel vehicle 1 is assumed to be a manned dump truck (manned travel vehicle) that is operated by the driver WM. The travel vehicle 1 may be an unmanned dump truck 1 (unmanned travel vehicle) that travels based on a command signal supplied from the outside of the travel vehicle 1. For example, if the travel of the unmanned dump truck is controlled based on detected steering angle data detected by the steering angle detection device 10B mounted on the unmanned dump truck, the detected steering angle data is corrected with first correction data to control the travel of the unmanned dump truck with high accuracy. For example, if the unmanned dump truck is caused to travel along a travel path set in a mine, a target steering angle may be set in a steering device of the unmanned dump truck. If feedback control is performed on the steering device such that the detected steering angle of the steering device is the target steering angle, an error of the detected steering angle is reduced. Accordingly, the unmanned dump truck can travel along the travel path with high accuracy.

REFERENCE SIGNS LIST

1 DUMP TRUCK (TRAVEL VEHICLE)
2 VEHICLE
2F FRONT SIDE
2R REAR SIDE
3 VESSEL
4 TRAVEL DEVICE
5 VEHICLE BODY
5A LOWER DECK
5B UPPER DECK
5C LADDER
5D LADDER
6 WHEEL
6F FRONT WHEEL
6R REAR WHEEL
7 AXLE
7F AXLE
7R AXLE
8 CAB
9 SUSPENSION CYLINDER
9F SUSPENSION CYLINDER
9R SUSPENSION CYLINDER
10 TRAVEL STATE DETECTION DEVICE
10A TRAVEL SPEED DETECTION DEVICE
10B STEERING ANGLE DETECTION DEVICE
10C ATTITUDE DETECTION DEVICE
11 LOADED STATE DETECTION DEVICE
12 OBJECT DETECTION DEVICE
12S EMISSION UNIT
13 BRAKE DEVICE
14 STEERING DEVICE
16 DRIVER'S SEAT
15 TRAVEL DIRECTION OPERATION UNIT
17 RETARDER OPERATION UNIT
19 TRAINER SEAT
20 DISPLAY DEVICE
21 WARNING DEVICE
22 POWER GENERATION DEVICE
24 OUTPUT OPERATION UNIT
25 BRAKE OPERATION UNIT
28 RETARDER
30 CONTROL DEVICE
31 DATA ACQUISITION UNIT
32 TURN DATA CALCULATION UNIT
33 STEERING ANGLE DATA CORRECTION UNIT
34 ATTITUDE DATA CORRECTION UNIT
35 DETERMINATION UNIT
36 CONTROL UNIT
37 STORAGE UNIT
141 COLUMN
142 ORIENTATION MEMBER
143 POTENTIOMETER
143A RESISTANCE PLATE
143B WIPER
300 CONTROL SYSTEM
400 STATE FUNCTION DETECTION SYSTEM
500 TRAVEL CONDITION ADJUSTMENT SYSTEM
600 PROCESSING SYSTEM
CL CENTER LINE
DPA DUMP SITE
DX ROTATION AXIS
HL TRAVEL ROAD
LM LOADING MACHINE
LPA LOAD SITE
R TURNING RADIUS
RL REFERENCE LINE
SD SPECIFIC DETECTION AREA
SD1 FIRST SECTION
SD2 SECOND SECTION
SD3 THIRD SECTION
SL DETECTION AREA
VX CENTER AXIS
WM DRIVER
V TRAVEL SPEED
$\theta c$ CALCULATED STEERING ANGLE
$\theta s$ DETECTED STEERING ANGLE
$\omega$ ANGULAR VELOCITY (YAW RATE)

The invention claimed is:

1. A travel vehicle comprising:
a vehicle including a travel device and a vehicle body supported by the travel device;
a steering device provided to the travel device;
a steering angle detection device configured to detect detected steering angle data of the steering device;
an attitude detection device configured to detect yaw rate data of the vehicle body;
a travel speed detection device configured to detect travel speed data of the travel device;
a turn data calculation unit configured to calculate turn data of the vehicle body based on the yaw rate data and the travel speed data;
a steering angle data correction unit configured to calculate first correction data on the detected steering angle data, based on a difference between the detected steering angle data and the turn data.

2. The travel vehicle according to claim 1, wherein
the steering angle detection device includes a potentiometer,
the attitude data includes yaw rate data of the vehicle body,
the turn data includes calculated steering angle data calculated based on the yaw rate data and the travel speed data, and
the steering angle data correction unit calculates the first correction data based on the detected steering angle data and the calculated steering angle data.

3. The travel vehicle according to claim 1, wherein
the attitude detection device includes an inertial measurement unit provided to the vehicle body, and
the steering angle data correction unit calculates the first correction data based on the turn data calculated from the attitude data that is detected when the travel speed data is equal to or more than a threshold.

4. The travel vehicle according to claim 3, comprising an attitude data correction unit configured to calculate second correction data on the attitude data, based on the attitude data that is detected by the attitude detection device when the travel speed data is zero.

5. The travel vehicle according to claim 1, comprising:
an object detection device, including a detection area ahead of the vehicle, configured to detect an object ahead of the vehicle;
a specific detection area setting unit configured to set, in the detection area, a specific detection area smaller than the detection area;
a processing system configured to perform a process for reducing damage from a collision;
a determination unit configured to determine, based on detection data of the object detection device, whether or not an object exists in the specific detection area; and
a control unit configured to output, to the processing system, a control signal for reducing damage from a collision based on a determination result of the determination unit, wherein
the specific detection area setting unit changes a shape of the specific detection area based on the detected steering angle data corrected with the first correction data.

6. A method for controlling a travel device, comprising:
detecting detected steering angle data of a steering device provided to a travel device of a vehicle;
detecting yaw rate data of a vehicle body of the vehicle supported by the travel device;
detecting travel speed data of the travel device;
calculating turn data of the vehicle body based on the yaw rate data and the travel speed data; and
calculating first correction data on the detected steering angle data, based on a difference between the detected steering angle data and the turn data.

* * * * *